US012696285B2

(12) United States Patent
Elshafie et al.

(10) Patent No.: US 12,696,285 B2
(45) Date of Patent: Jul. 28, 2026

(54) DECODING-BASED CHANNEL STATE INFORMATION FOR ENERGY HARVESTING

(71) Applicant: QUALCOMM Incorporated, San Diego, CA (US)

(72) Inventors: Ahmed Elshafie, San Diego, CA (US); Ahmed Attia Abotabl, San Diego, CA (US); Alexandros Manolakos, Athens (GR); Yuchul Kim, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/713,408

(22) PCT Filed: Jan. 23, 2023

(86) PCT No.: PCT/US2023/061087
§ 371 (c)(1),
(2) Date: May 24, 2024

(87) PCT Pub. No.: WO2023/158905
PCT Pub. Date: Aug. 24, 2023

(65) Prior Publication Data
US 2025/0024457 A1 Jan. 16, 2025

(30) Foreign Application Priority Data

Feb. 17, 2022 (GR) .............................. 20220100146

(51) Int. Cl.
*H04W 72/23* (2023.01)
*H04B 17/309* (2015.01)
(Continued)

(52) U.S. Cl.
CPC .......... *H04W 72/23* (2023.01); *H04B 17/346* (2023.05); *H04L 1/0026* (2013.01); *H04W 52/325* (2013.01)

(58) Field of Classification Search
CPC .. H02J 50/001; H02J 2101/22; H02J 13/1331; H02J 9/005
See application file for complete search history.

(56) References Cited

U.S. PATENT DOCUMENTS

2022/0346022 A1* 10/2022 Butt .................... H04W 52/028

OTHER PUBLICATIONS

Aprem A., et al., "Transmit Power Control with ARQ in Energy Harvesting Sensors: A Decision-theoretic Approach", Global Communications Conference (GLOBECOM) , IEEE, Dec. 3, 2012, pp. 3388-3393, XP032375195, DOI: 10.1109/GLOCOM.2012. 6503638, ISBN: 978-1-4673-0920-2, The whole document.
(Continued)

*Primary Examiner* — Tu X Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a first physical downlink shared channel (PDSCH) transmission transmitted using a first modulation and coding scheme (MCS). The UE may transmit, to the base station, feedback based at least in part on decoding the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting. Numerous other aspects are described.

30 Claims, 14 Drawing Sheets

100 ⟶

(51) Int. Cl.
    *H04L 1/00*         (2006.01)
    *H04W 52/32*      (2009.01)

(56)             References Cited

OTHER PUBLICATIONS

Hu J., et al., "Modulation and Coding Design for Simultaneous Wireless Information and Power Transfer", IEEE Communications Magazine, IEEE Service Center, Piscataway, US, vol. 57, No. 5, May 1, 2019, pp. 124-130, XP011724462, ISSN: 0163-6804, DOI: 10.1109/MCOM.2019.1700925, The whole document.
International Search Report and Written Opinion—PCT/US2023/061087—ISA/EPO—Apr. 28, 2023.
Kang J-M., et al., "Dynamic Power Splitting for SWIPT With Nonlinear Energy Harvesting in Ergodic Fading Channel", IEEE Internet of Things Journal, IEEE, USA, vol. 7, No. 6, Mar. 11, 2020, pp. 5648-5665, XP011793078, DOI: 10.1109/JIOT.2020.2980328 [retrieved on Jun. 12, 2020] p. 5651.

* cited by examiner

900

Base Station 110

UE 120

905
Indication of energy state

910
Indication of feedback mode

915
PDSCH transmission

920
Decode PDSCH transmission and/or perform energy harvesting

925
Feedback in accordance with feedback mode

Receive a first PDSCH transmission transmitted using a first MCS

1110

Transmit feedback based at least in part on decoding the first PDSCH transmission, wherein the feedback includes an ACK or NACK and a CSI report that includes at least an indication of a second MCS based at least in part on a target BLER and a target changing rate for energy harvesting

1120

1100

1210 — Transmit a first PDSCH transmission using a first MCS

1220 — Receive feedback associated with the first PDSCH transmission, wherein the feedback includes and ACK or NACK and a CSI report that includes an indication of a second MCS based at least in part on a target BLER and a target charging rate for energy harvesting by the UE

1200

DECODING-BASED CHANNEL STATE INFORMATION FOR ENERGY HARVESTING

CROSS-REFERENCE TO RELATED APPLICATION

This Patent Application is a 371 national stage of PCT Application No. PCT/US2023/061087 filed on Jan. 23, 2023, entitled "DECODING-BASED CHANNEL STATE INFORMATION FOR ENERGY HARVESTING," which claims priority to Greek Nonprovisional patent application No. 20220100146, filed on Feb. 17, 2022, entitled "DECODING-BASED CHANNEL STATE INFORMA- TION FOR ENERGY HARVESTING," which are hereby expressly incorporated by reference herein.

FIELD OF THE DISCLOSURE

Aspects of the present disclosure generally relate to wireless communication and to techniques and apparatuses for decoding-based channel state information (CSI) for energy harvesting.

BACKGROUND

Wireless communication systems are widely deployed to provide various telecommunication services such as tele- phony, video, data, messaging, and broadcasts. Typical wireless communication systems may employ multiple- access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division syn- chronous code division multiple access (TD-SCDMA) sys- tems, and Long Term Evolution (LTE). LTE/LTE-Advanced is a set of enhancements to the Universal Mobile Telecom- munications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to commu- nicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggrega- tion. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a base station, a first physical downlink shared channel (PDSCH) transmission transmitted using a first modulation and coding scheme (MCS). The one or more processors may be configured to transmit, to the base station, feedback based at least in part on decoding the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting.

Some aspects described herein relate to a base station for wireless communication. The base station may include a memory and one or more processors coupled to the memory. The one or more processors may be configured to transmit, to a UE, a first PDSCH transmission using a first MCS. The one or more processors may be configured to receive, from the UE, feedback associated with the first PDSCH transmis- sion, wherein the feedback includes an ACK or NACK and a CSI report that includes at least an indication of a second MCS based at least in part on a target BLER and a target charging rate for energy harvesting by the UE.

Some aspects described herein relate to a method of wireless communication performed by a UE. The method may include receiving, from a base station, a first PDSCH transmission transmitted using a first MCS. The method may include transmitting, to the base station, feedback based at least in part on decoding the first PDSCH transmission, wherein the feedback includes an ACK or NACK and a CSI report that includes at least an indication of a second MCS based at least in part on a target BLER and a target charging rate for energy harvesting.

Some aspects described herein relate to a method of wireless communication performed by a base station. The method may include transmitting, to a UE, a first PDSCH transmission using a first MCS. The method may include receiving, from the UE, feedback associated with the first PDSCH transmission, wherein the feedback includes an ACK or NACK and a CSI report that includes at least an indication of a second MCS based at least in part on a target BLER and a target charging rate for energy harvesting by the UE.

Some aspects described herein relate to a non-transitory computer-readable medium that stores a set of instructions for wireless communication by a UE. The set of instructions, when executed by one or more processors of the UE, may cause the UE to receive, from a base station, a first PDSCH transmission transmitted using a first MCS. The set of instructions, when executed by one or more processors of the UE, may cause the UE to transmit, to the base station, feedback based at least in part on decoding the first PDSCH transmission, wherein the feedback includes an ACK or NACK and a CSI report that includes at least an indication of a second MCS based at least in part on a target BLER and a target charging rate for energy harvesting.

Some aspects described herein relate to a non-transitory computer-readable medium that stores a set of instructions for wireless communication by a base station. The set of instructions, when executed by one or more processors of the base station, may cause the base station to transmit, to a UE, a first PDSCH transmission using a first MCS. The set of instructions, when executed by one or more processors of the base station, may cause the base station to receive, from the UE, feedback associated with the first PDSCH transmission, wherein the feedback includes an ACK or NACK and a CSI report that includes at least an indication of a second MCS based at least in part on a target BLER and a target charging rate for energy harvesting by the UE.

Some aspects described herein relate to an apparatus for wireless communication. The apparatus may include means for receiving, from a base station, a first PDSCH transmission transmitted using a first MCS. The apparatus may include means for transmitting, to the base station, feedback based at least in part on decoding the first PDSCH transmission, wherein the feedback includes an ACK or NACK and a CSI report that includes at least an indication of a second MCS based at least in part on a target BLER and a target charging rate for energy harvesting.

Some aspects described herein relate to an apparatus for wireless communication. The apparatus may include means for transmitting, to a UE, a first PDSCH transmission using a first MCS. The apparatus may include means for receiving, from the UE, feedback associated with the first PDSCH transmission, wherein the feedback includes an ACK or NACK and a CSI report that includes at least an indication of a second MCS based at least in part on a target BLER and a target charging rate for energy harvesting by the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
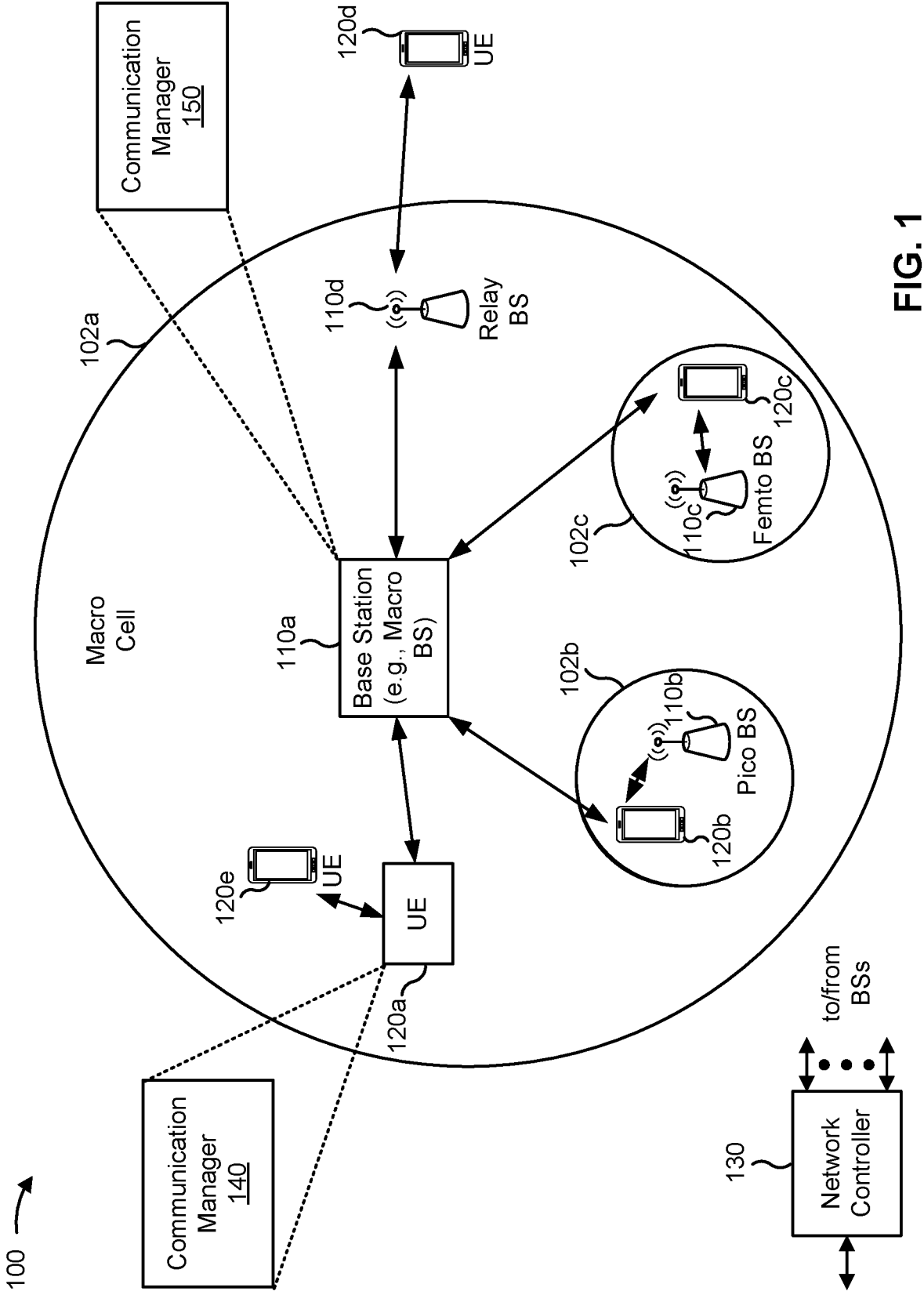
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a first physical downlink shared channel (PDSCH) transmission transmitted using a first modulation and coding scheme (MCS); and transmit, to the base station, feedback based at least in part on decoding the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting. Additionally, or alternatively, the communication manager 140 may perform one or more other operations described herein.

In some aspects, the base station 110 may include a communication manager 150. As described in more detail elsewhere herein, the communication manager 150 may transmit, to a UE, a first PDSCH transmission using a first MCS; and receive, from the UE, feedback associated with the first PDSCH transmission, wherein the feedback includes an ACK or NACK and a CSI report that includes at least an indication of a second MCS based at least in part on a BLER and a target charging rate for energy harvesting by the UE. Additionally, or alternatively, the communication manager 150 may perform one or more other operations described herein.

As indicated above, FIG. 1 is provided as an example. Other examples may differ from what is described with regard to FIG. 1.

Figure 2:
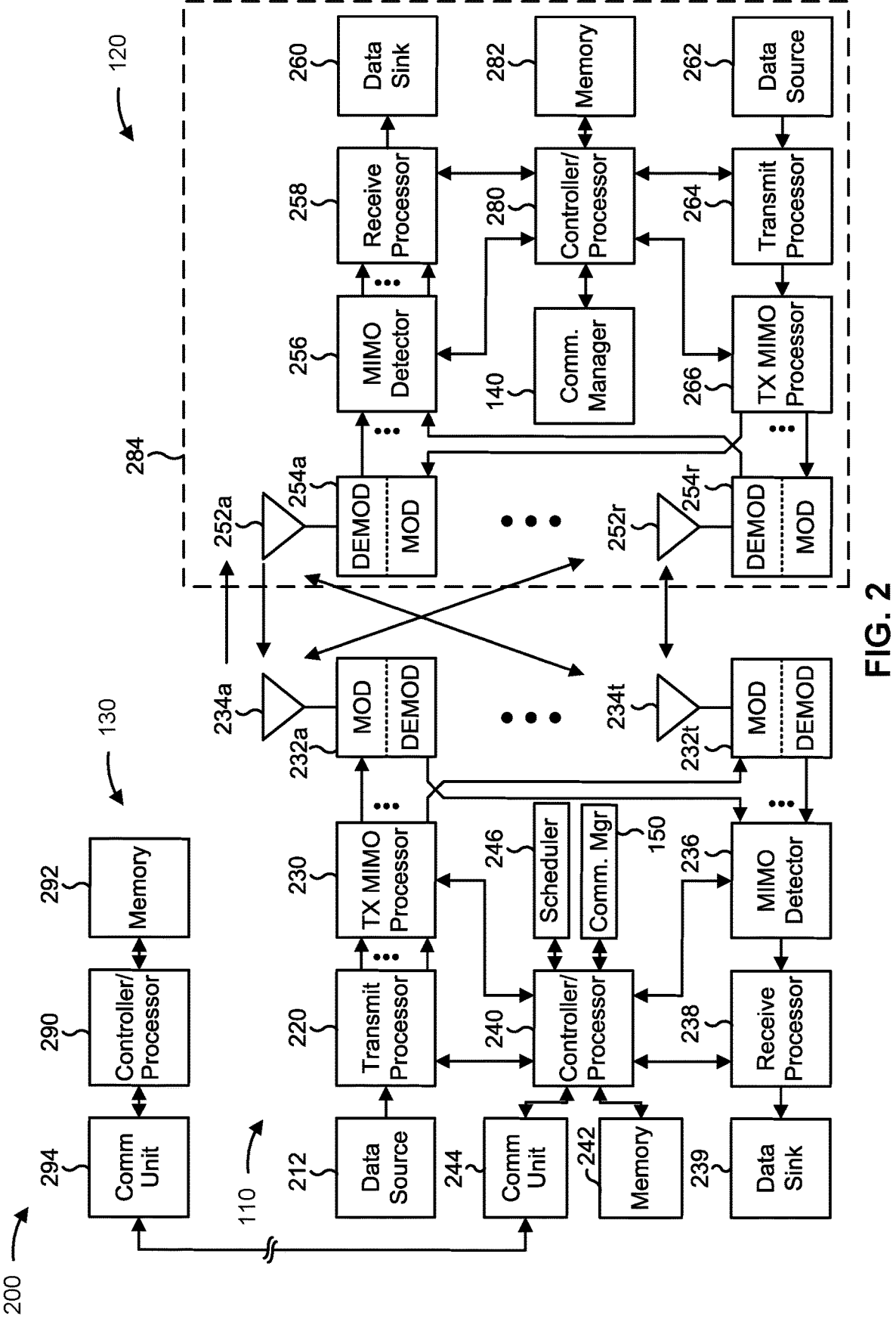
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs)

received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the base station 110, the controller/processor 280 of the UE 120, and/or any other component(s) of FIG. 2 may perform one or more techniques associated with decoding-based CSI for energy harvesting, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving, from a base station, a first PDSCH transmission transmitted using a first MCS; and/or means for transmitting, to the base station, feedback based at least in part on decoding the first PDSCH transmission, wherein the feedback includes an ACK or NACK and a CSI report that includes at least an indication of a second MCS based at least in part on a target BLER and a target charging rate for energy harvesting. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a first PDSCH transmission transmitted using a first MCS; and/or means for receiving, from the UE, feedback associated with the first PDSCH transmission, wherein the feedback includes an ACK or NACK and a CSI report that includes at least an indication of a second MCS based at least in part on a target BLER and a target charging rate for energy harvesting by the UE. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
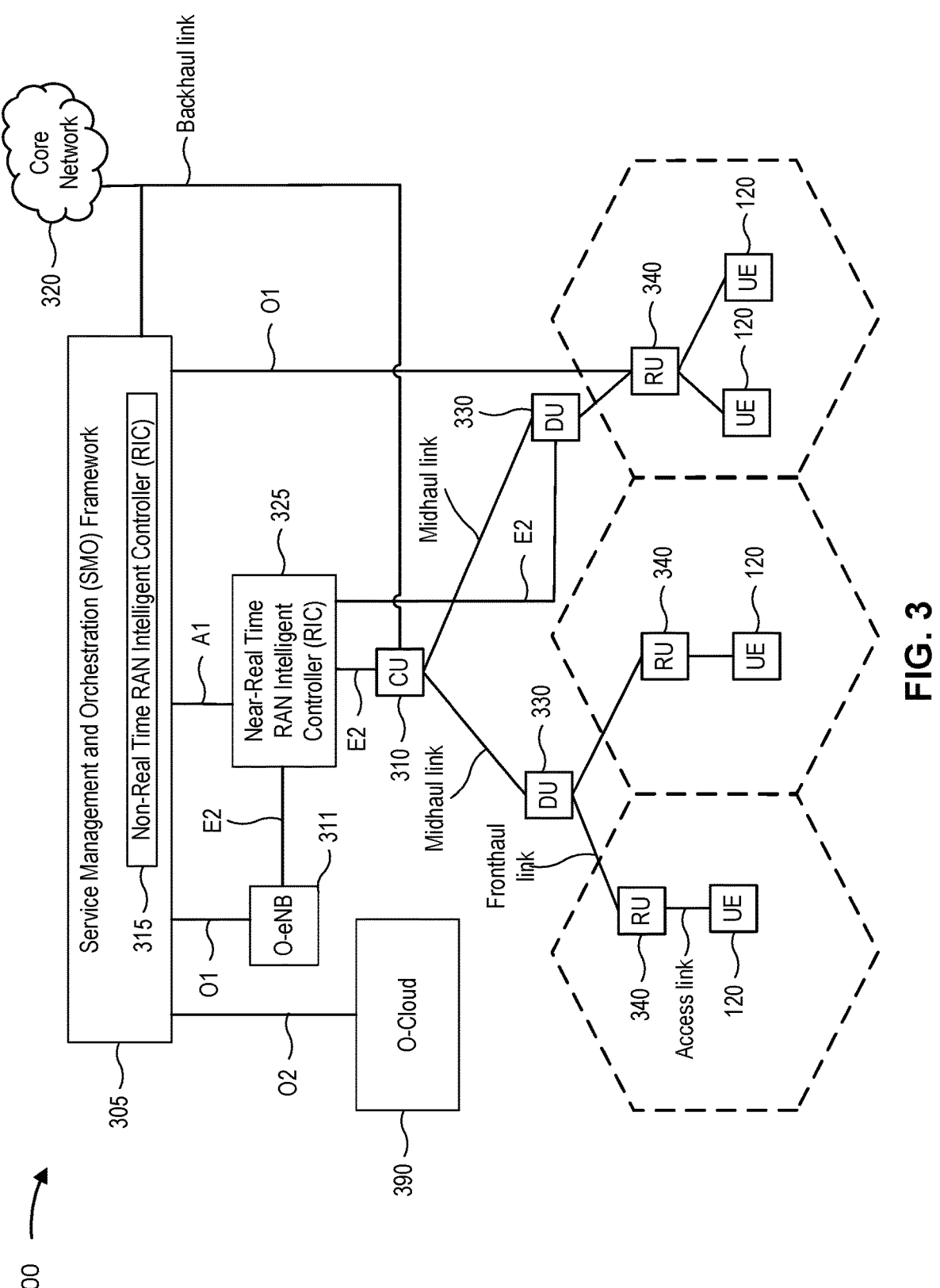
FIG. 3 is a diagram illustrating an example disaggregated base station architecture, in accordance with the present disclosure.

FIG. 3 is a diagram illustrating an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with respect to FIG. 3.

Figure 4:
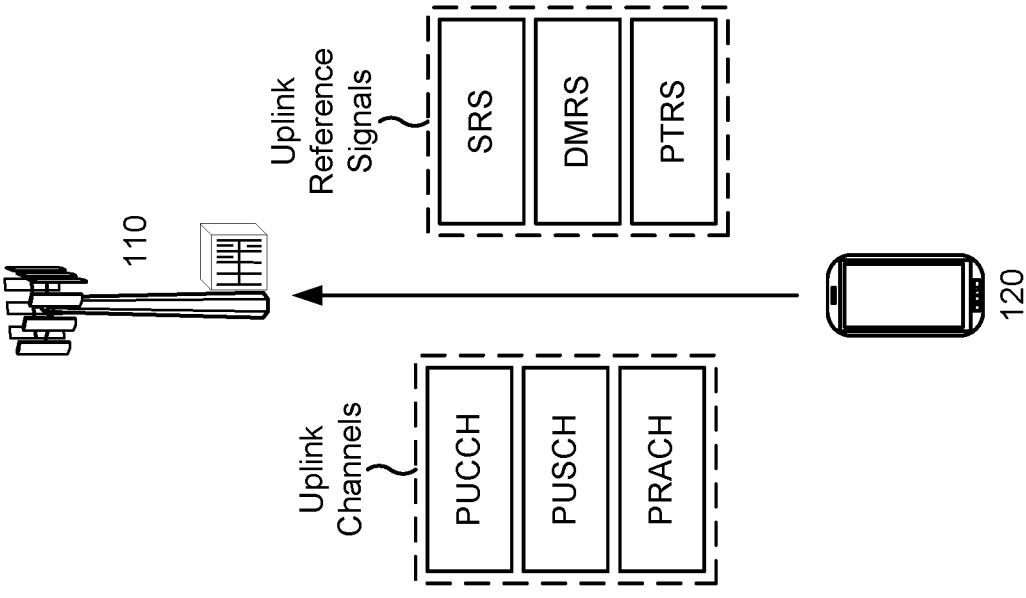
FIG. 4 is a diagram illustrating an example of physical channels and reference signals in a wireless network, in accordance with the present disclosure.
Figure 4:
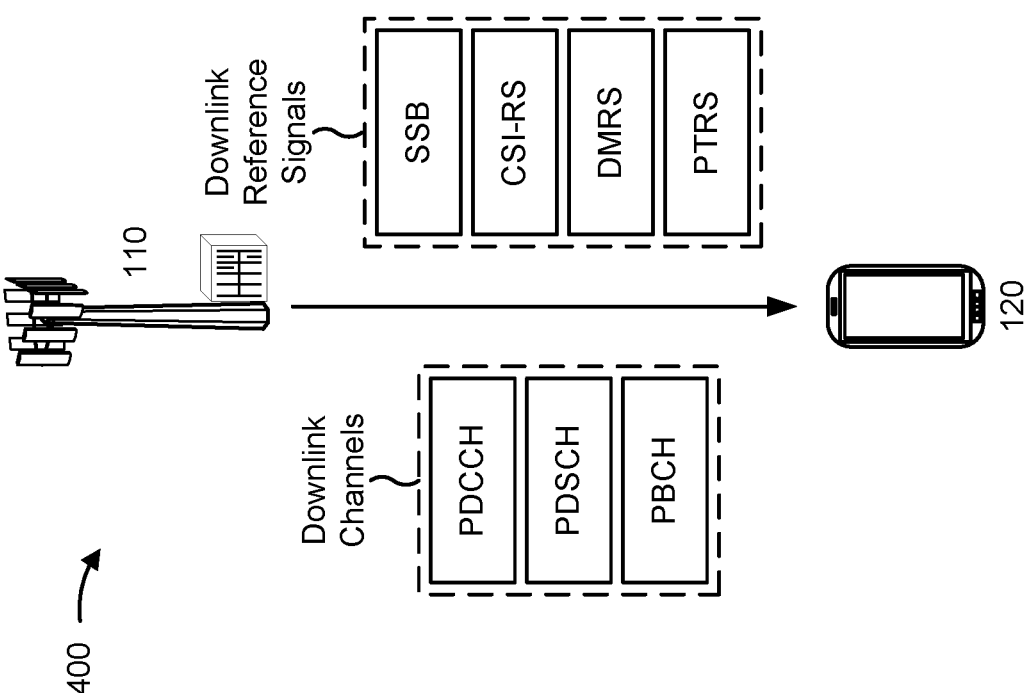

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit ACK or NACK feedback (e.g., ACK/NACK feedback or ACK/NACK information) in UCI on the PUCCH and/or the PUSCH.

As further shown, a downlink reference signal may include a synchronization signal block (SSB), a CSI reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

In some aspects, the UE 120 may transmit decoding-based CSI feedback to the base station 110 in connection with receiving and decoding one or more PDSCH communications. In this case, the UE 120 may receive a PDSCH communication, and the UE 120 may report CSI (e.g., one or more channel estimation parameters) determined from the PDSCH communication. The UE 120 may transmit a CSI report including the decoding-based CSI together with the HARQ-ACK/NACK. The HARQ feedback that includes the ACK/NACK and the CSI report may be referred to as "Turbo HARQ." In some aspects, the CSI report may include an indication of a delta-MCS determined from a transport block (TB) received in the PDSCH communication. The TB received in the PDSCH communication may have an MCS index $I_{MCS}$. The UE 120 may calculate delta-MCS as the difference between $I_{MCS\_target}$ and $I_{MCS}$, where $I_{MCS\_target}$ is the largest MCS index such that an estimated BLER for the TB received in the PDSCH communication would be less than or equal to a configured target BLER. Accordingly, the delta-MCS may provide an indication of a suggested change to the MCS based at least in part on the current channel conditions.

As indicated above, FIG. 4 is provided as an example. Other examples may differ from what is described with regard to FIG. 4.

Figure 5:
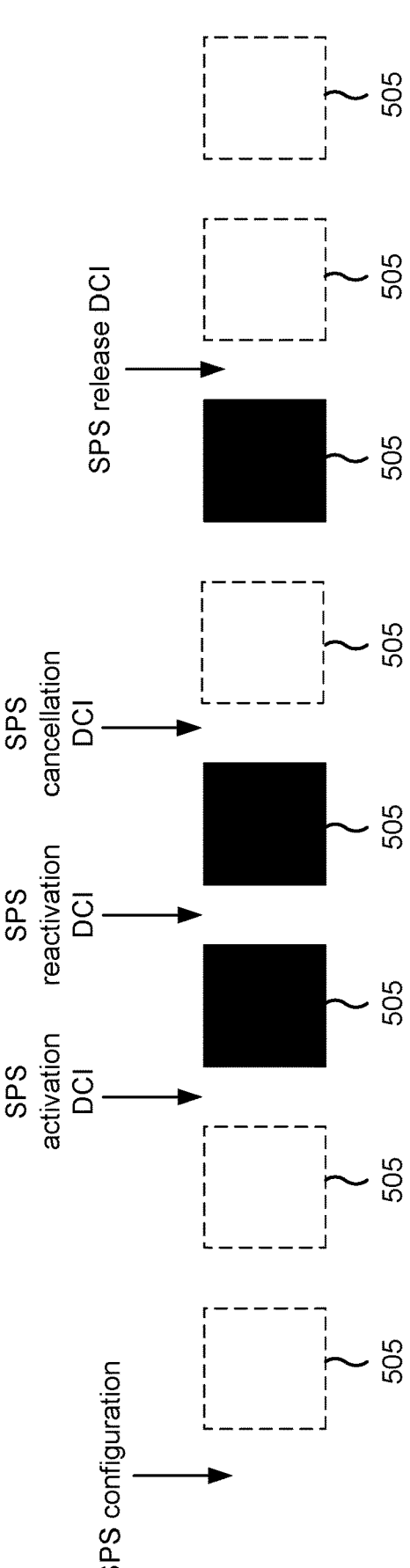
FIG. 5 is a diagram illustrating an example of downlink semi-persistent scheduling (SPS) communication, in accordance with the present disclosure.

FIG. 5 is a diagram illustrating an example 500 of downlink semi-persistent scheduling (SPS) communication, in accordance with the present disclosure. SPS communications may include periodic downlink communications that are configured for a UE, such that the base station does not need to send separate DCI to schedule each downlink communication, thereby conserving signaling overhead.

As shown in example 500, a UE may be configured with an SPS configuration for SPS communications. For example, the UE may receive the SPS configuration via a radio resource control (RRC) message transmitted by a base station. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 505 for the UE. The SPS configuration may also configure hybrid automatic repeat request (HARQ)-ACK (HARQ-ACK) feedback resources for the UE to transmit HARQ-ACK feedback for SPS PDSCH communications received in the SPS occasions 505. For example, the SPS configuration may indicate a PDSCH-to-HARQ feedback timing value, which may be referred to as a K1 value in a wireless communication standard (e.g., a 3GPP standard).

The base station may transmit SPS activation DCI to the UE to activate the SPS configuration for the UE. The base station may indicate, in the SPS activation DCI, communication parameters, such as an MCS, a resource block (RB) allocation, and/or antenna ports, for the SPS PDSCH communications to be transmitted in the scheduled SPS occasions 505. The UE may begin monitoring the SPS occasions 505 based at least in part on receiving the SPS activation DCI. For example, beginning with a next scheduled SPS occasion 505 subsequent to receiving the SPS activation DCI, the UE may monitor the scheduled SPS occasions 505 to decode PDSCH communications using the communication parameters indicated in the SPS activation DCI. The UE may refrain from monitoring configured SPS occasions 505 prior to receiving the SPS activation DCI.

The base station may transmit SPS reactivation DCI to the UE to change the communication parameters for the SPS PDSCH communications. Based at least in part on receiving the SPS reactivation DCI, the UE may begin monitoring the scheduled SPS occasions 505 using the communication parameters indicated in the SPS reactivation DCI. For example, beginning with a next scheduled SPS occasion 505 subsequent to receiving the SPS reactivation DCI, the UE may monitor the scheduled SPS occasions 505 to decode PDSCH communications based on the communication parameters indicated in the SPS reactivation DCI.

In some cases, such as when the base station does not have downlink traffic to transmit to the UE, the base station may transmit SPS cancellation DCI to the UE to temporarily cancel or deactivate one or more subsequent SPS occasions 505 for the UE. The SPS cancellation DCI may deactivate only a subsequent one SPS occasion 505 or a subsequent N SPS occasions 505 (where N is an integer). SPS occasions 505 after the one or more (e.g., N) SPS occasions 505 subsequent to the SPS cancellation DCI may remain activated. Based at least in part on receiving the SPS cancellation DCI, the UE may refrain from monitoring the one or more (e.g., N) SPS occasions 505 subsequent to receiving the SPS cancellation DCI. As shown in example 500, the SPS cancellation DCI cancels one subsequent SPS occasion 505 for the UE. After the SPS occasion 505 (or N SPS occasions) subsequent to receiving the SPS cancellation DCI, the UE may automatically resume monitoring the scheduled SPS occasions 505.

The base station may transmit SPS release DCI to the UE to deactivate the SPS configuration for the UE. The UE may stop monitoring the scheduled SPS occasions 505 based at least in part on receiving the SPS release DCI. For example, the UE may refrain from monitoring any scheduled SPS occasions 505 until another SPS activation DCI is received from the base station. Whereas the SPS cancellation DCI may deactivate only a subsequent one SPS occasion 505 or a subsequent N SPS occasions 505, the SPS release DCI deactivates all subsequent SPS occasions 505 for a given SPS configuration for the UE until the given SPS configuration is activated again by a new SPS activation DCI.

As indicated above, FIG. 5 is provided as an example. Other examples may differ from what is described with respect to FIG. 5.

Figure 6:
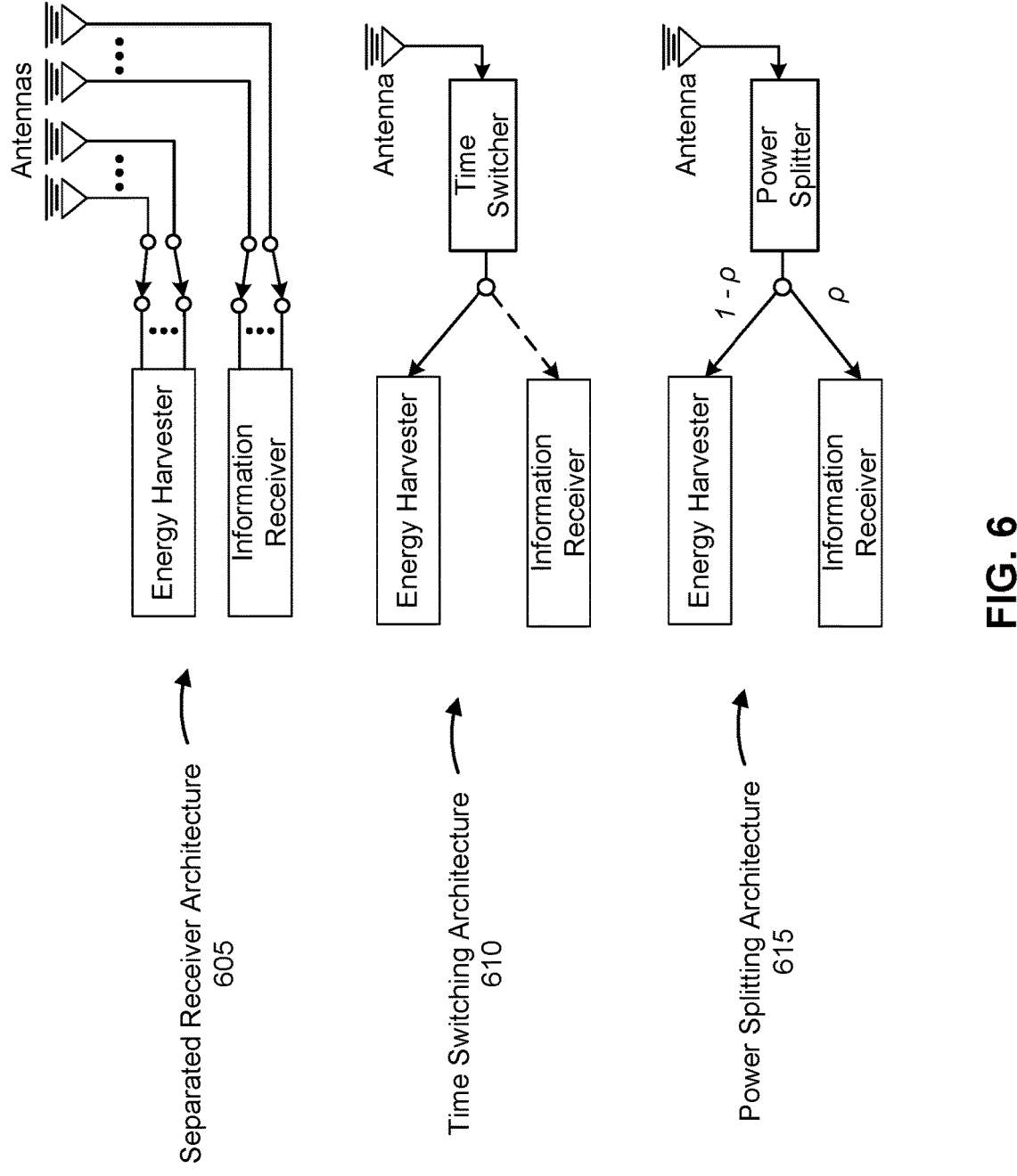
FIG. 6 is a diagram illustrating examples of radio frequency energy harvesting, in accordance with the present disclosure.

FIG. 6 is a diagram illustrating examples 600 of radio frequency (RF) energy harvesting, in accordance with the present disclosure. As shown in FIG. 6, an RF receiver (e.g., a UE 120) may receive signals (e.g., radio signals carried on radio waves) from an RF transmitter (e.g., a base station 110 or a UE 120) and convert electromagnetic energy of the signals (e.g., using a rectenna comprising a dipole antenna with an RF diode) into direct current electricity for use by the RF receiver.

As shown by reference number 605, in some aspects, the RF receiver may use a separated receiver architecture, where a first set of antennas is configured to harvest energy, and a second set of antennas is configured to receive data. In this situation, each set of antennas may be separately configured to receive signals at certain times, frequencies, and/or via one or more particular beams, such that all signals received by the first set of antennas are harvested for energy by an energy harvester (e.g., an energy harvester circuit), and all signals received by the second set of antennas are processed to receive information by an information receiver (e.g., an information receiver/decoder circuit).

As shown by reference number 610, in some aspects, the RF receiver may use a time-switching architecture to harvest energy. The time-switching architecture allows the RF receiver to switch between an energy harvester that harvests energy from received signals and an information receiver that decodes received signals to receive information. The time-switching architecture may use one or more antennas to receive signals, and whether the signals are harvested for energy or processed to receive information depends on the time at which the signals are received. For example, one or more first time slots may be time slots during which received signals are sent to one or more energy harvesting components (e.g., the energy harvester) to harvest energy, and one or more second time slots may be time slots during which received signals are processed and decoded (e.g., by the information receiver) to receive information. In some aspects, the time slots may be pre-configured (e.g., by the RF receiver, the RF transmitter, or another device). The energy harvested at receiver j from source i may be calculated as $E_j = \eta P_i |g_{i-j}|^2 \alpha T$, where $0 \leq \alpha \leq 1$ is a fraction of a total time period T allocated for energy harvesting, $P_i$ is a transmit power, $|g_{i-j}|^2$ is a channel power gain, and $\eta$ (e.g., $0 \leq \eta \leq 1$) is an energy harvesting efficiency. Letting $\kappa$ and W denote a noise spectral density and a channel bandwidth, respectively, the data rate for the time-switching architecture may be calculated as $$R_{i-j} = (1 - \alpha)\log_2\left(1 + \frac{|g_{i-j}|^2 P_i}{\kappa W}\right).$$

As shown by reference number 615, in some aspects, the RF receiver may use a power-splitting architecture to harvest energy. The power-splitting architecture may use one or more antennas to receive signals, and the signals are handled by one or both of the energy harvesting and/or information receiving components according to an energy harvesting rate. The received signals may be split into two streams (e.g., one for the energy harvester and another for the information receiver) with different power levels. For example, the RF receiver may be configured to use a first portion of received signals for energy harvesting and the remaining received signals for information receiving. The energy harvesting rate is dependent on (e.g., a fraction of) power of a received signal that is allocated for energy harvesting. In some aspects, the energy harvesting rate may be pre-configured (e.g., by the RF receiver, the RF transmitter, or another device). The energy harvested at receiver j from source i may be calculated as $E_j = \eta(1-\rho)P_i |g_{i-j}|^2 T$, where $0 \leq 1-\rho \leq 1$ is the energy harvesting rate (e.g., the fraction of the power allocated for energy harvesting). The data rate for the power-splitting architecture may be calculated as $$R_{i-j} = \log_2\left(1 + \frac{|g_{i-j}|^2 \rho P_i}{\kappa W}\right).$$

Energy harvested by the RF receiver may be used and/or stored for later use. For example, in some aspects, the RF receiver may be powered directly by the harvested energy. In some aspects, the RF receiver may use an energy storage device, such as a battery, capacitor, and/or supercapacitor, to gather and store harvested energy for immediate and/or later use. In some cases, an energy harvesting device (e.g., a UE) may perform one or more other types of energy harvesting, such as solar energy harvesting, vibration energy harvesting, and/or thermal energy harvesting, in addition to RF energy harvesting.

As indicated above, FIG. 6 is provided as one or more examples. Other examples may differ from what is described with respect to FIG. 6.

In some cases, a UE may utilize RF energy harvesting to provide power for certain network communication tasks, such as data decoding, data reception, and/or data transmission, among other examples. In some examples, RF energy harvesting may be used to charge a battery of a reduced capability or low power UE (e.g., an IoT UE or wearable device, among other examples) such that the UE may perform tasks, such as data decoding, operating some filters, data encoding, data transmission, and/or data transmission, among other examples. In some examples, a reduced capability or low power UE may use energy harvesting to operate as a self-sustainable network node that can interact in a network through the energy harvested from RF transmissions in the network. In some cases, it may be beneficial, to an energy harvesting UE, for a base station to adjust the MCS for downlink (e.g., PDSCH) communications to the UE based at least in part on RF energy harvesting requirements of the UE. For example, for a UE with a power-splitting RF energy harvesting architecture, a lower coding rate (e.g., lower MCS) may allow the UE to harvest a greater amount of energy from a PDSCH communication, as compared to a higher coding rate (e.g., higher MCS). However, the base station may not be aware of the RF energy harvesting requirements of the UE, and therefore may transmit PDSCH communications using an MCS that is not efficient for RF energy harvesting by the UE.

Some techniques and apparatuses described herein enable decoding-based CSI for RF energy harvesting by a UE. In some aspects, the UE may receive, from a base station, a first PDSCH transmission using a first MCS. The UE may transmit, to the base station, feedback based at least in part on decoding the first PDSCH transmission, and the feedback may include an ACK or NACK and a CSI report that includes an indication of a second MCS based at least in part on a target BLER and a target charging rate for energy harvesting. In some aspects, the UE may receive, from the base station, a second PDSCH transmission transmitted using the second MCS, and the UE may perform energy harvesting from the second PDSCH transmission based at least in part on the target charging rate. As a result, the UE may provide feedback that enables the base station to adjust the MCS based at least in part on the target charging rate for energy harvesting, which may increase the efficiency of RF energy harvesting by the UE.

Figure 7:
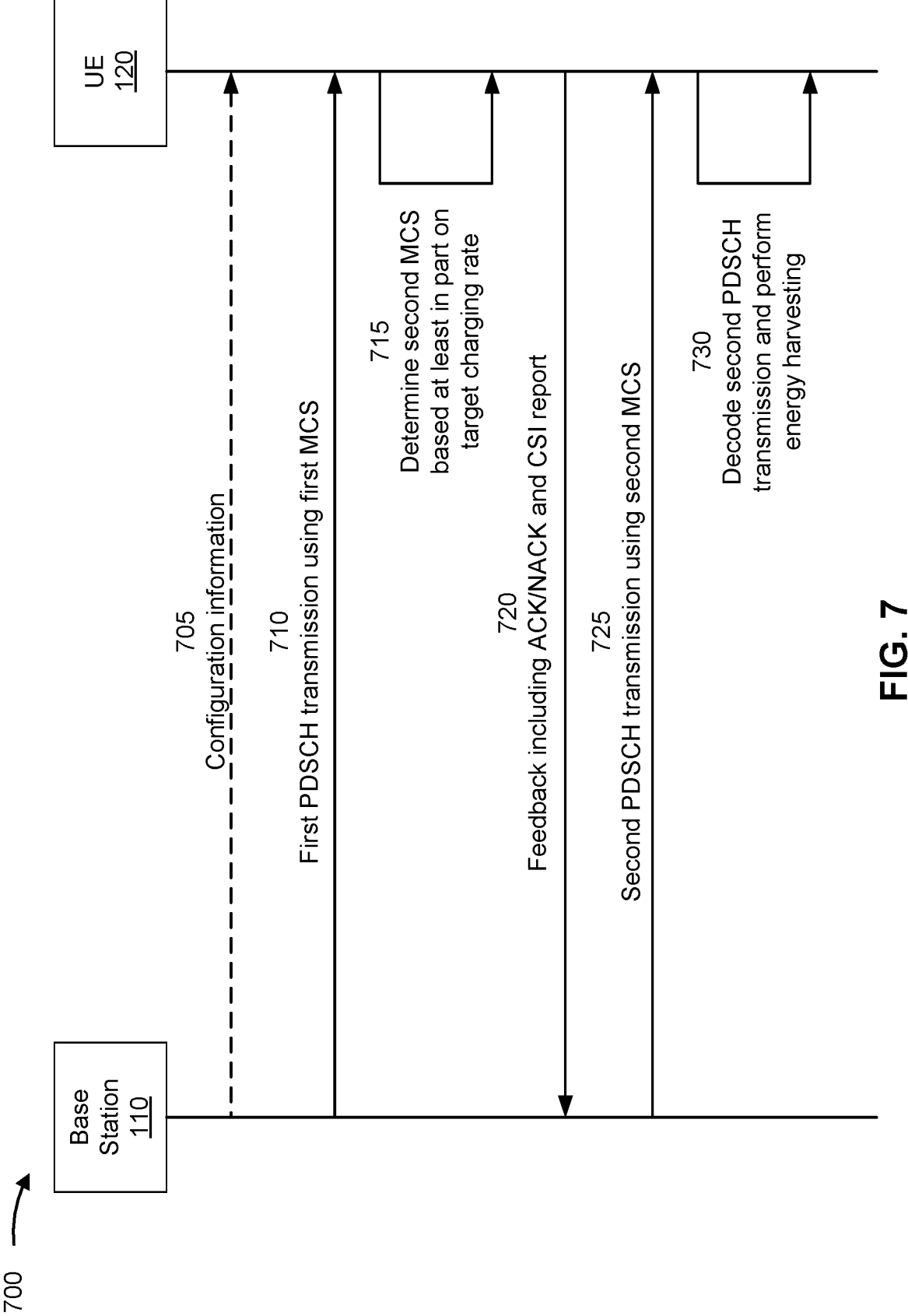
FIG. 7 is a diagram illustrating an example associated with decoding-based channel state information (CSI) for energy harvesting, in accordance with the present disclosure.

FIG. 7 is a diagram illustrating an example 700 associated with decoding-based CSI for energy harvesting, in accordance with the present disclosure. As shown in FIG. 7, example 700 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, the UE 120 may utilize a power-splitting RF energy harvesting architecture for RF energy harvesting from downlink communications (e.g., PDSCH transmissions) from the base station 110. The UE 120 may split the power of a downlink communication (e.g., PDSCH transmission) between decoding (e.g., data reception) and energy harvesting based at least in part on a data reception power splitting factor $\rho$ and an energy harvesting power splitting factor $1-\rho$. The data reception power splitting factor $\rho$ (e.g., $0 \le \rho \le 1$) is the fraction of power allocated for decoding the downlink communication (e.g., PDSCH transmission), and the energy harvesting power splitting factor $1-\rho$ (e.g., $0 \le 1-\rho \le 1$) is the fraction of power allocated for RF energy harvesting from the downlink communication (e.g., PDSCH transmission).

As shown in FIG. 7, and by reference number 705, the base station 110 may transmit configuration information to the UE 120. The UE 120 may receive the configuration information transmitted by the base station 110. In some aspects, the configuration information may be included in an RRC message or a medium access control (MAC) control element (MAC-CE).

In some aspects, the configuration information may include an indication of a target BLER for decoding downlink transmissions. The target BLER may be a BLER requirement that is used by the UE 120 to determine whether decoding of a downlink transmission is successful or unsuccessful. In some aspects, the configuration information may indicate multiple target BLERs. For example, the configuration information may indicate different target BLERs for downlink communications with different priorities. In some aspects, the configuration information may include multiple target BLERs, for the same priority, that are associated with different energy harvesting modes or energy harvesting states. For example, a set of target BLERs for a priority may include a first target BLER to be used by an energy harvesting UE (or a UE operating in an energy harvesting mode) and a second target BLER to be used by a UE without energy harvesting (or a UE operating in a non-energy harvesting mode). Additionally, or alternatively, a set of target BLERs for a priority may include a plurality of target BLERs associated with respective energy harvesting states. For example, different energy harvesting states may correspond to different battery levels of an energy harvesting UE.

In some aspects, the configuration information may include an indication of a plurality MCS and power splitting factor configurations. Each MCS and power splitting factor configuration may be a configuration of a maximum MCS and a power splitting factor for energy harvesting. The power splitting factor may be indicated as $\rho$ or $1-\rho$. Each MCS and power splitting factor configuration may be associated with a respective index value that may be used by the UE 120 to indicate that MCS and power splitting factor configuration in a decoding-based CSI report. In one example, index value 00 may correspond to a maximum MCS of 15 and $\rho=0.2$, index value 01 may correspond to a maximum MCS of 10 and $\rho=0.4$, index value 10 may correspond to a maximum MCS of 4 and $\rho=0.5$, and index value 11 may correspond to a maximum MCS of 2 and $\rho=0.6$. The MCS values are MCS index values, and each MCS index value identifies a combination of a number of spatial streams, a modulation type, and a coding rate (e.g., how much of a data stream is used to transmit usable data). Higher MCS values may indicate higher data rates. In some aspects, higher MCS values may be used with lower values of $\rho$ because the UE 120 may require a higher signal-to-interference-plus-noise ratio (SINR) to decode a PDSCH transmission at a higher MCS value than at a lower MCS value.

As further shown in FIG. 7, and by reference number 710, the base station 110 may transmit, to the UE 120, a first PDSCH transmission using a first MCS. The UE 120 may receive the first PDSCH transmission. For example, the first PDSCH transmission may be a PDSCH transmission scheduled by DCI in a PDCCH communication, or the first PDSCH transmission may be an SPS PDSCH transmission.

The UE 120 may decode the first PDSCH transmission. The UE 120 may decode the first PDSCH transmission and/or perform energy harvesting from the first PDSCH transmission based at least in part on an initial power splitting factor $\rho_0$. In some aspects, the UE 120 may decode the first PDSCH transmission, and the UE 120 may not perform energy harvesting from the first PDSCH transmission (e.g., $\rho_0=1$). In some aspects, in a case in which $\rho_0<1$, the UE 120 may decode the first PDSCH transmission using a first portion $(\rho_0)$ of the total received power associated with the first PDSCH transmission, and the UE 120 may perform energy harvesting from the first PDSCH transmission using a second portion $(1-\rho_0)$ of the total received power associated with the first PDSCH transmission.

As further shown in FIG. 7, and by reference number 715, the UE 120 may determine a second MCS based at least in part on a target charging rate for energy harvesting. In some aspects, the UE 120 may determine the second MCS based at least in part on the target charging rate and the target BLER configured for decoding the PDSCH transmission. In some aspects, the target charging rate may be a target amount of power to be used by the UE 120 for energy harvesting from a next PDSCH communication. The UE 120 may determine a power splitting factor $\rho_{new}$ associated with the target charging rate. For example, the UE 120 may determine the power splitting factor $\rho_{new}$ to achieve the target charging rate, such that $P_{new}=(1-\rho_{new})P$, where $P_{new}$ is the target charging rate and P is the total received power associated with the first PDSCH transmission.

The UE 120 may determine an adjusted SINR associated with the target charging rate. The UE 120 may determine the adjusted SINR at least in part on a measured SINR of the first PDSCH transmission and a power splitting factor associated with the target charging rate. For example, the UE 120 may determine the adjusted SINR as $SINR_{new}=SINR_{PDSCH}*\rho_{new}$, where $SINR_{new}$ is the adjusted SINR and $SINR_{PDSCH}$ is the total measured SINR for the first PDSCH transmission (e.g., the SINR of the full power signal for the first PDSCH transmission without power splitting for energy harvesting). The adjusted SINR may provide an estimate of the SINR that will be available for decoding when applying the power splitting factor $\rho_{new}$ associated with the target charging rate.

The UE 120 may determine the second MCS based at least in part on an adjusted SINR and the target BLER. For example, the second MCS may be determined as a function of the adjusted SINR and the target BLER (e.g., $MCS_{new}=F$ $(SINR_{new}$, target BLER), where $MCS_{new}$ is the second MCS). For example, the UE 120 may determine the second MCS as the largest MCS index for which a TB received with this index with the adjusted SINR would satisfy (e.g., be less than or equal to) the target BLER. In this way, the second MCS index may be any MCS index that will satisfy the target BLER with the adjusted SINR of a PDSCH transmission while using the remaining signal power of the PDSCH transmission to achieve the target charging rate for energy harvesting.

As further shown in FIG. 7, and by reference number 720, the UE 120 may transmit, to the base station 110, feedback including ACK/NACK feedback and a CSI report. The CSI report may include an indication of the second MCS that is based at least in part on the target BLER and the target charging rate. The feedback associated with the first PDSCH transmission, may include an ACK (e.g., a HARQ-ACK) to indicate successful decoding of the first PDSCH transmission, or a NACK (e.g., a HARQ-NACK) to indicate unsuccessful decoding of the first PDSCH transmission. The feedback associated with the first PDSCH transmission may a decoding-based CSI report that includes the indication of the second MCS.

In some aspects, the indication of the second MCS may be an indication of a difference (delta-MCS) between the first MCS and the second MCS. For example, delta-MCS may be a difference between the MCS index value of the first MCS and the MCS index value of the second MCS.

In some aspects, the indication of the second MCS may be an indication of an index value associated with an MCS and power splitting factor configuration. For example, in a case in which the configuration information indicates a plurality of MCS and power splitting factor configurations and corresponding index values, the UE 120 may indicate, in the decoding-based CSI report, the index value associated with a selected MCS and power splitting factor configuration from the plurality of MCS and power splitting configurations. In this case, the selected MCS and power splitting factor configuration would indicate a recommendation for the second MCS and the power splitting factor $\rho_{new}$ to be used for a next PDSCH transmission.

As further shown in FIG. 7, and by reference number 725, the base station 110 may transmit, to the UE 120, a second PDSCH transmission using the second MCS. The UE 120 may receive the second PDSCH transmission transmitted using the second MCS. In some aspects, the second PDSCH transmission may be a repetition of the PDSCH data as the first PDSCH transmission. In some aspects, the second PDSCH transmission may be a transmission of different PDSCH data from the first PDSCH transmission.

As further shown in FIG. 7, and by reference number 730, the UE 120 may decode the second PDSCH transmission and perform energy harvesting from the second PDSCH transmission in accordance with the power splitting factor $\rho_{new}$ associated with the target charging rate. In some aspects, the UE 120 may decode the second PDSCH transmission using a first portion of a total received power associated with the second PDSCH transmission, and the UE 120 may perform energy harvesting from the second PDSCH transmission using a second portion of the total received power associated with the second PDSCH transmission. The first portion and the second portion of the total received power may be based at least in part on a power splitting factor $\rho_{new}$ associated with the target charging rate. For example, the first portion $P_1$ may be $P_1=\rho_{new}*P_{tot}$, and the second portion $P_2$ may be $P_2=(1-\rho_{new})*P_{tot}$, where $P_{tot}$ is the total received power associated with the second PDSCH transmission.

In some aspects, the base station 110 may change configurations of target BLERs, as well as the reported decoding-based CSI for a given BLER, based at least in part on an energy harvesting mode (or capability) or an energy harvesting state (e.g., battery level) of the UE 120 and/or based at least in part on a priority or quality of service (QoS) requirements associated with a PDSCH transmission. In some aspects, for an energy harvesting device (e.g., the UE 120) and low priority communications, the base station 110 may configure (e.g., via RRC or MAC-CE configuration information) a higher target BLER than a target BLER configured for other UEs that do not perform energy harvesting. In this way, the energy harvesting UE 120 may be able to harvest energy with increased diversity due to increased repetition of the same PDSCH data with a high coding gain. In some aspects, the base station 110 may maintain a lower target BLER (e.g., for high priority communications), and the UE 120 may use lower MCS values for energy harvesting devices (e.g., the UE 120) than for non-energy harvesting devices, which may allow for higher power splitting for energy harvesting for the energy harvesting devices.

In some aspects, the target BLER used by the UE 120 to determine the second MCS may be a target BLER associated with at least one of an energy harvesting mode (or capability) or an energy state (e.g., battery level) of the UE 120. In some aspects, the UE 120 may transmit, to the base station 110, an indication of the energy harvesting mode and/or the energy state of the UE 120. For example, the UE 120 may transmit, to the base station 110, capability and/or assistance information including an indication of a capability of the UE 120 for energy harvesting, an indication that the UE 120 is in an energy harvesting mode, and/or an indication of the energy state (e.g., battery level) of the UE 120. The base station 110 may determine the target BLER associated with at least one or the energy harvesting mode or the energy state of the UE 120 based at least in part on the indication received from the UE 120. The base station 110 may transmit, and the UE 120 may receive, configuration information including an indication of the target BLER associated with at least one of the energy harvesting mode or the energy state of the UE 120.

In some aspects, the base station 110 may transmit, and the UE 120 may receive, configuration information including an indication of a plurality of target BLERs for a same priority, and the plurality of target BLERs may be associated with respective energy harvesting modes or energy harvesting states. In this case, the UE 120 may select a target BLER to use for decoding a PDSCH communication from the plurality of target BLERs configured for the priority associated with the PDSCH communication, based at least in part on the energy harvesting mode and/or the energy state (e.g., battery level) of the UE 120. For example, the UE 120 may select the target BLER for the first PDSCH (e.g., the target BLER used to determine the second MCS) from the plurality of target BLERs indicated in the configuration information based at least in part on the energy harvesting mode and/or the energy state of the UE 120.

In some aspects, the UE 120 may transmit the feedback including the decoding-based CSI report after receiving multiple PDSCH transmissions transmitted using the first MCS. In some aspects, the UE 120 may transmit the feedback including the decoding-based CSI report after receiving a certain number of PDSCH transmissions. For example, the UE 120 may transmit the CSI report to the base station 110 after receiving M PDSCH transmissions (e.g., after each sequence of M PDSCH transmissions). In this case, M may be an RRC or MAC-CE configured parameter. In some aspects, the UE 120 may transmit the CSI report after receiving one or more PDSCH transmissions transmitted using the first MCS (e.g., one or more first PDSCH transmissions) in a time window (e.g., a first time window). In this case, the CSI report may include CSI associated with all of the PDSCH transmissions received by the UE 120 in the time window. The duration of the time window may be RRC or MAC-CE configured.

In some aspects, the CSI report transmitted by the UE 120 (e.g., after receiving M PDSCH transmissions or after receiving PDSCH transmissions in the first time window) may indicate pathloss information associated with the received PDSCH transmissions (e.g., to be used by the base station 110 to determine an amount of energy by the UE 120), pathloss difference information between the pathloss information associated with the received PDSCH transmissions and previous pathloss information, the target charging rate, a difference between the target charging rate and a previous charging rate, a target power splitting factor for energy harvesting, a difference between the target power splitting factor and a previous power splitting factor, a plurality of MCS levels associated with respective target charging rates or target power splitting factors, a predicted energy state for the UE 120, and/or a predicted power profile for the UE 120.

In some aspects, the CSI report transmitted by the UE 120 (e.g., after receiving M PDSCH transmissions or after receiving PDSCH transmissions in the first time window) may indicate at least one of a recommended component carrier and bandwidth part pair, a maximum quantity of repetitions for uplink communications, a maximum MCS level, a maximum quantity of component carriers and active bandwidth parts, a maximum quantity of CSI processes, a maximum quantity of transmit and receive antennas, or a maximum quantity of low-density parity-check code iterations.

In some aspects, in a case in which the UE 120 transmits the CSI report after receiving one or more PDSCH transmissions (e.g., one or more first PDSCH transmissions) in the first time window, the UE 120 may then receive one or more PDSCH transmissions (e.g., one or more second PDSCH transmissions) in a second time window, and the one or more PDSCH transmissions in the second time window may be based at least in part on the CSI report including the CSI associated with the one or more PDSCH transmissions in the first time window. For example, the base station 110 may transmit the PDSCH transmissions in the second time window using an MCS (e.g., the second MCS) and/or other transmission parameters determined based at least in part on the CSI included in the CSI report received from the UE 120 after the first time window.

In some aspects, in a case in which the UE 120 transmits the CSI report after receiving a first sequence of M PDSCH transmissions, the UE 120 may then receive a second sequence of M PDSCH transmissions, and the second sequence of M PDSCH transmissions may be based at least in part on the CSI report including the CSI associated with the first sequence of M PDSCH transmissions. For example, the base station 110 may transmit the second sequence of M PDSCH transmissions using an MCS (e.g., the second MCS) and/or other transmission parameters determined based at least in part on the CSI included in the CSI report received from the UE 120 after the first sequence of M PDSCH transmissions.

In some aspects, the operations described above in connection with FIG. 7 with respect to downlink (e.g., PDSCH and/or PDCCH) transmissions and uplink (e.g., PUCCH) transmissions between the base station 110 and the UE 120 may be similarly performed by a first UE and a second UE for sidelink transmissions (e.g., physical sidelink shared channel (PSSCH), physical sidelink control channel (PSCCH), and/or physical sidelink feedback channel (PSFCH) transmissions) between the first UE and the second UE.

As indicated above, FIG. 7 is provided as an example. Other examples may differ from what is described with respect to FIG. 7.

Figure 8:
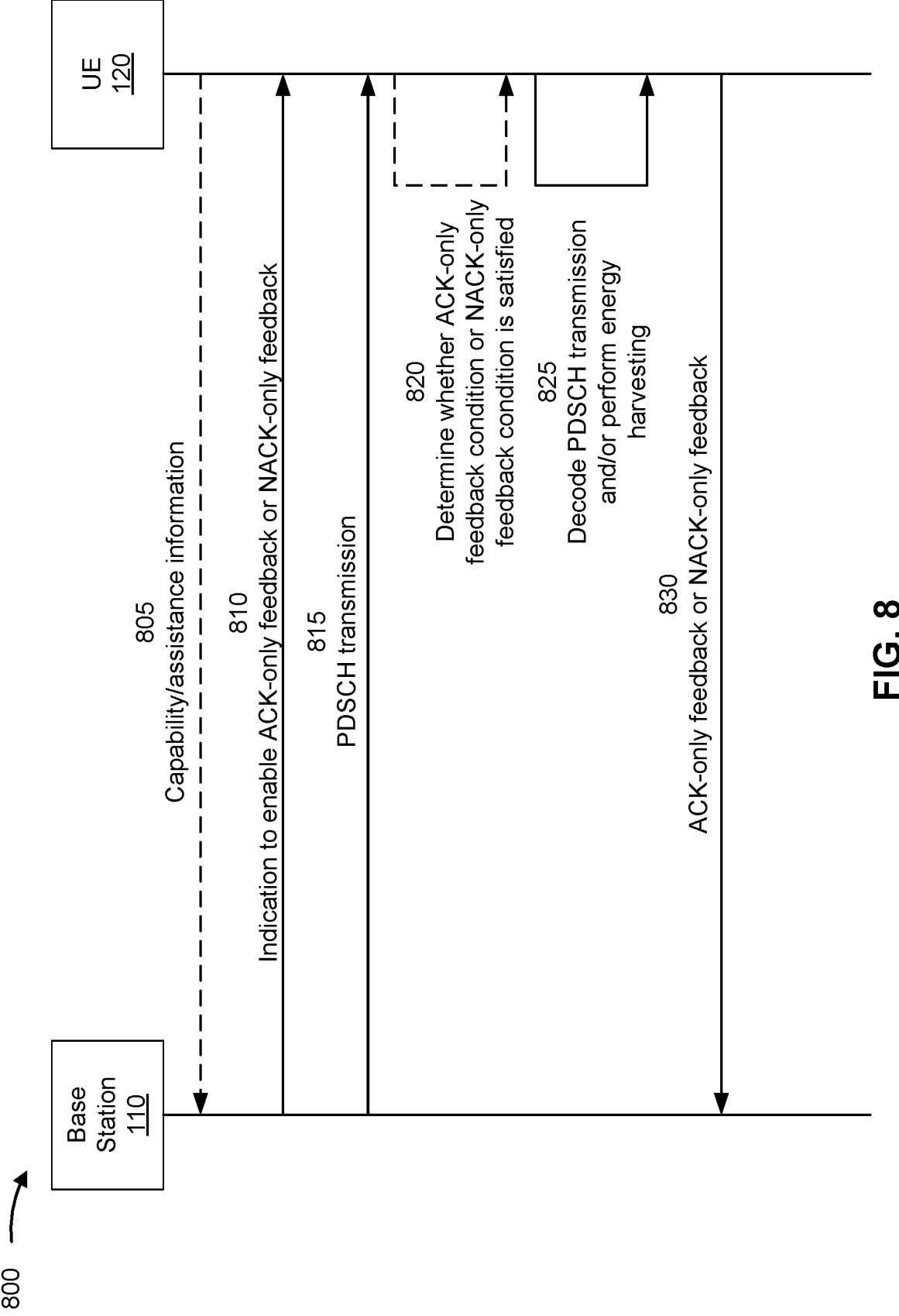
FIG. 8 is a diagram illustrating an example associated with acknowledgement-only or negative-acknowledgement-only feedback for energy harvesting, in accordance with the present disclosure.

FIG. 8 is a diagram illustrating an example 800 associated with ACK-only or NACK-only feedback for energy harvesting, in accordance with the present disclosure. As shown in FIG. 8, example 800 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 8, and by reference number 805, the UE 120 may transmit capability and/or assistance information to the base station 110. The base station 110 may receive the capability and/or assistance information. For example, the capability and/or assistance information may be included in an RRC message and/or a MAC-CE. In some aspects, the information may include an indication of a capability of the UE 120 for energy harvesting. In some aspects, the information may include an indication of whether or not the UE 120 is operating in an energy harvesting mode. In some aspects, the information may include an indication of a UE type of the UE 120. For example, the information may include an indication of whether the UE 120 is a reduced capability UE, an IoT UE, or a low power UE, among other examples. In some aspects, the information may include an indication of an energy state of the UE 120. For example, the indication of the energy state may include a report of a battery status (e.g., battery level) of the UE 120.

As further shown in FIG. 8, and by reference number 810, the base station 110 may transmit, to the UE 120, an indication to enable ACK-only feedback or NACK-only feedback for the UE 120. The UE 120 may receive the indication to enable ACK-only feedback or NACK-only feedback. For example, the indication to enable ACK-feedback or NACK-only feedback may be included in an RRC message or a MAC-CE.

In some aspects, the base station 110 may transmit the indication to enable ACK-only feedback or NACK-only feedback for the UE 120 based at least in part on the capability and/or assistance information received from the UE 120. In some aspects, the base station 110 may enable ACK-only feedback or NACK-only feedback for the UE 120 based at least in part on receiving an indication that the UE 120 is capable of energy harvesting or based at least in part on an indication that the UE 120 is operating in an energy harvesting mode. In some aspects, the base station 110 may enable ACK-only feedback or NACK-only feedback for the UE 120 based at least in part on receiving an indication of the UE type of the UE 120. For example, the base station 110 may enable ACK-only feedback or NACK-only feedback for the UE 120 based at least in part on an indication that the UE 120 is a reduced capability UE, an IoT UE, or a low power UE, among other examples.

In some aspects, the base station 110 may enable ACK-only feedback or NACK-only feedback based at least in part on an energy state (e.g., battery status/level) of the UE 120. In some aspects, the base station 110 may enable ACK-only feedback or NACK-only feedback for the UE 120 based at least in part on receiving, from the UE 120, a battery status report that indicates that the battery level of the UE 120 satisfies (e.g., is less than or equal to) a threshold for enabling ACK-only feedback or NACK-only feedback. For example, the UE 120 may periodically transmit the report of the battery status to the base station 110, or the UE 120 may report the battery status to the base station 110 in connection with a determination, by the UE 120, that the battery level is below a certain level (e.g., less than or equal to the threshold).

In some aspects, the base station 110 may transmit the indication to enable ACK-only feedback or NACK-only feedback based at least in part on a capability of the UE 120, an energy harvesting mode of the UE 120, a UE type of the UE 120, and/or an energy state (e.g., battery status/level) of the UE 120. In some aspects, the base station 110 may select between enabling ACK-only feedback or NACK-only feedback based at least in part on a target BLER, a traffic pattern associated with the UE 120, and/or other factors relating to power savings for the UE 120 resulting from ACK-only or NACK-only feedback. In some aspects, the base station 110 may enable NACK-only feedback for an energy harvesting UE (e.g., UE 120) when the target BLER is small (e.g., 10%). In such cases, NACK-only feedback may result in more power savings for the UE 120 (e.g., as compared to ACK-only feedback) because the UE 120 may only transmit NACK-feedback and only a small percentage (e.g., 10%) of downlink (e.g., PDSCH) communications to the UE 120 will result in NACK feedback.

In some aspects, the base station 110 may enable ACK-only feedback for an energy harvesting UE (e.g., UE 120) in cases in which the target BLER is high and/or in cases of low expected traffic arrivals for the UE 120. For example, the UE 120 may be configured with downlink SPS with a low periodicity of traffic arrival, resulting in many skipped SPS occasions (e.g., SPS occasions in which no PDSCH communications is transmitted to the UE 120). When there is a skipped PDSCH (e.g., a skipped SPS occasion), the UE 120 may transmit a NACK or a dummy NACK in connection with the SPS occasion. Accordingly, in cases in which the periodicity of traffic arrivals for the UE 120 is low (e.g., relative to scheduled SPS occasions for the UE 120), ACK-only feedback may increase powers savings and energy efficiency for the UE because the probability of a ACK (e.g., a non-skipped PDSCH communication) in an SPS occasion is low and the probability of a NACK (e.g., a skipped PDSCH communication) in an SPS is high.

In some aspects, the base station 110 may transmit, to the UE 120, a configuration of an ACK-only feedback condition (or conditions) and/or a NACK-only feedback condition (or condition). The ACK-only feedback condition is a condition that triggers or activates ACK-only feedback for the UE 120. The NACK-only feedback condition is a condition that triggers or activates NACK-only feedback for the UE 120. For example, the configuration of the ACK-only feedback condition or the NACK-only feedback condition may include an indication of a threshold for the battery level of the UE 120. The configuration of the ACK-only feedback condition and/or the NACK-only feedback condition may be included (e.g., together with the indication to enable ACK-only feedback or NACK-only feedback for the UE 120) in an RRC message or a MAC-CE. In some aspects, the base station 110 may transmit the indication to the UE 120 that ACK-only feedback is enabled and the configuration of the ACK-only feedback condition (e.g., the battery level threshold) based at least in part on the energy harvesting capability (or energy harvesting mode) of the UE 120 or based at least in part on the UE type of the UE 120. In some aspects, the base station 110 may transmit the indication to the UE 120 that NACK-only feedback is enabled and the configuration of the NACK-only feedback condition (e.g., the battery level threshold) based at least in part on the energy harvesting capability (or energy harvesting mode) of the UE 120 or based at least in part on the UE type of the UE 120.

As further shown in FIG. 8, and by reference number 815, the base station 110 may transmit, to the UE 120, a PDSCH transmission. For example, the PDSCH transmission may be scheduled via DCI in a PDCCH transmission, or the PDSCH transmission may be an SPS PDSCH transmission. The UE 120 may receive the PDSCH transmission.

As further shown in FIG. 8, and by reference number 820, in some aspects, the UE 120 may determine whether a ACK-only feedback condition or a NACK-only feedback condition is satisfied. In some aspects, the UE 120 may receive a configuration of a ACK-only feedback condition from the base station 110. For example, the configuration of the ACK-only feedback condition may indicate a battery level threshold for activating ACK-only feedback for the UE 120. In some aspects, the ACK-only feedback condition may be preconfigured for the UE 120. For example, the ACK-only feedback condition may be a preconfigured battery level threshold specified in a wireless communication standard (e.g., a 3GPP standard). In a case in which the configuration of the ACK-only feedback condition is received from the base station 110 or in which the ACK-only feedback condition is preconfigured (e.g., in accordance with a wireless communication standard), the UE 120 may determine whether the ACK-only feedback condition is satisfied. In some aspects, the UE 120 may determine whether the ACK-only feedback condition is satisfied based at least in part on a current battery status of the UE 120. For example, the UE 120 may determine whether a current battery level of the UE 120 satisfies (e.g., is less than or equal to) the battery level threshold associated with the ACK-only feedback condition. In some aspects, the ACK-only feedback condition may include one or more other conditions (e.g., a target BLER threshold and/or a traffic periodicity threshold, among other examples) in addition to or instead of the battery level threshold.

In some aspects, the UE 120 may receive a configuration of a NACK-only feedback condition from the base station 110. For example, the configuration of the NACK-only feedback condition may indicate a battery level threshold for activating NACK-only feedback for the UE 120. In some aspects, the NACK-only feedback condition may be preconfigured for the UE 120. For example, the NACK-only feedback condition may be a preconfigured battery level threshold specified in a wireless communication standard (e.g., a 3GPP standard). In a case in which the configuration of the NACK-only feedback condition is received from the base station 110 or in which the NACK-only feedback condition is preconfigured (e.g., in accordance with a wireless communication standard), the UE 120 may determine whether the NACK-only feedback condition is satisfied. In some aspects, the UE 120 may determine whether the NACK-only feedback condition is satisfied based at least in part on a current battery status of the UE 120. For example, the UE 120 may determine whether a current battery level of the UE 120 satisfies (e.g., is less than or equal to) the battery level threshold associated with the NACK-only feedback condition. In some aspects, the NACK-only feedback condition may include one or more other conditions (e.g., a target BLER threshold, among other examples) in addition to or instead of the battery level threshold.

In some aspects, the UE 120 may not be configured (or preconfigured) with the ACK-only feedback condition or a NACK-only feedback condition. In this case, ACK-only feedback or NACK-only feedback may be activated for the UE 120 in connection with the UE 120 receiving the indication to enable ACK-only feedback or NACK-only feedback for the UE 120.

As further shown in FIG. 8, and by reference number 825, the UE 120 may decode the PDSCH transmission, and/or the UE 120 may perform energy harvesting from the PDSCH transmission. In some aspects, the UE 120 may utilize a power splitting RF energy harvesting architecture. In this case, the UE 120 may decode the PDSCH transmission and/or perform energy harvesting from the PDSCH transmission in accordance with a power splitting factor $\rho$. For example, a first portion of the total received power P associated with the PDSCH transmission that is used for decoding (or attempting to decode) the PDSCH transmission may be $P_1=\rho*P$, and a second portion of the total received power P associated with the PDSCH transmission that is used for energy harvesting may be $P_2=(1-\rho)*P$.

As further shown in FIG. 8, and by reference number 830, the UE 120 may transmit ACK-only feedback or NACK-only feedback for the PDSCH transmission. In some aspects, when ACK-only feedback is activated for the UE 120 (e.g., based at least in part on the indication to enable ACK-only feedback and/or the determination that the ACK-only feedback condition is satisfied), the UE 120 may transmit ACK-only feedback for all PDSCH transmissions received while ACK-only feedback is activated. For a PDSCH transmission received from the base station 110, the UE 120 may determine whether the PDSCH transmission is successfully decoded (e.g., an ACK is observed) or the PDSCH transmission is not successfully decoded (e.g., a NACK is observed). In the case in which the PDSCH transmission is successfully decoded, the UE 120 may transmit the ACK feedback (e.g., HARQ-ACK) to the base station 110. However, the UE 120 may not transmit NACK feedback to the base station 110. In the case in which the PDSCH transmission is not successfully decoded while ACK-only feedback is activated, the UE 120 may not transmit any feedback to the base station 110.

The ACK-only feedback may result in power saving for an energy harvesting device (e.g., the UE 120). If the PDSCH decoding is unsuccessful (e.g., a NACK is observed), or the UE 120 cannot begin the decoding process due to a lack of power, the base station 110 may retransmit the data in the PDSCH transmission, which may allow the PDSCH data to be decoded and may provide additional RF signals for energy harvesting. In addition, with extra retransmissions of PDSCH data, the UE 120 may perform energy harvesting using the entire signal for a PDSCH retransmission if the UE 120 does not need to decode the PDSCH retransmission. In some aspects, the ACK-only feedback may provide power savings for the UE 120 in cases in which the target BLER is high (e.g., greater than or equal to a target BLER threshold) and/or in cases in which the periodicity of expected traffic arrivals for the UE 120 is low relative to scheduled PDSCH occasions (e.g., SPS occasions) for the UE 120.

In some aspects, when NACK-only feedback is activated for the UE 120 (e.g., based at least in part on the indication to enable NACK-only feedback and/or the determination that the NACK-only feedback condition is satisfied), the UE 120 may transmit NACK-only feedback for all PDSCH transmissions received while NACK-only feedback is activated. For a PDSCH transmission received from the base station 110, the UE 120 may determine whether the PDSCH transmission is successfully decoded (e.g., an ACK is observed) or the PDSCH transmission is not successfully decoded (e.g., a NACK is observed). In the case in which the PDSCH transmission is not successfully decoded, the UE 120 may transmit the NACK feedback (e.g., HARQ-NACK) to the base station 110. However, the UE 120 may not transmit ACK feedback to the base station 110. In the case in which the PDSCH transmission is successfully decoded while NACK-only feedback is activated, the UE 120 may not transmit any feedback to the base station 110.

The NACK-only feedback may result in power saving for an energy harvesting device (e.g., the UE 120). In some aspects, the NACK-only feedback may provide power savings for the UE 120 in cases in which the target BLER is small (e.g., less than or equal to a target BLER threshold) and NACK feedback is expected for a small percentage of PDSCH communications.

In some aspects, the operations described above in connection with FIG. 8 with respect to downlink (e.g., PDSCH and/or PDCCH) transmissions and uplink (e.g., PUCCH) transmissions between the base station 110 and the UE 120 may be similarly performed by a first UE and a second UE for sidelink (e.g., PSSCH, PSCCH, and/or PSFCH) transmissions between the first UE and the second UE.

As indicated above, FIG. 8 is provided as an example. Other examples may differ from what is described with respect to FIG. 8.

Figure 9:
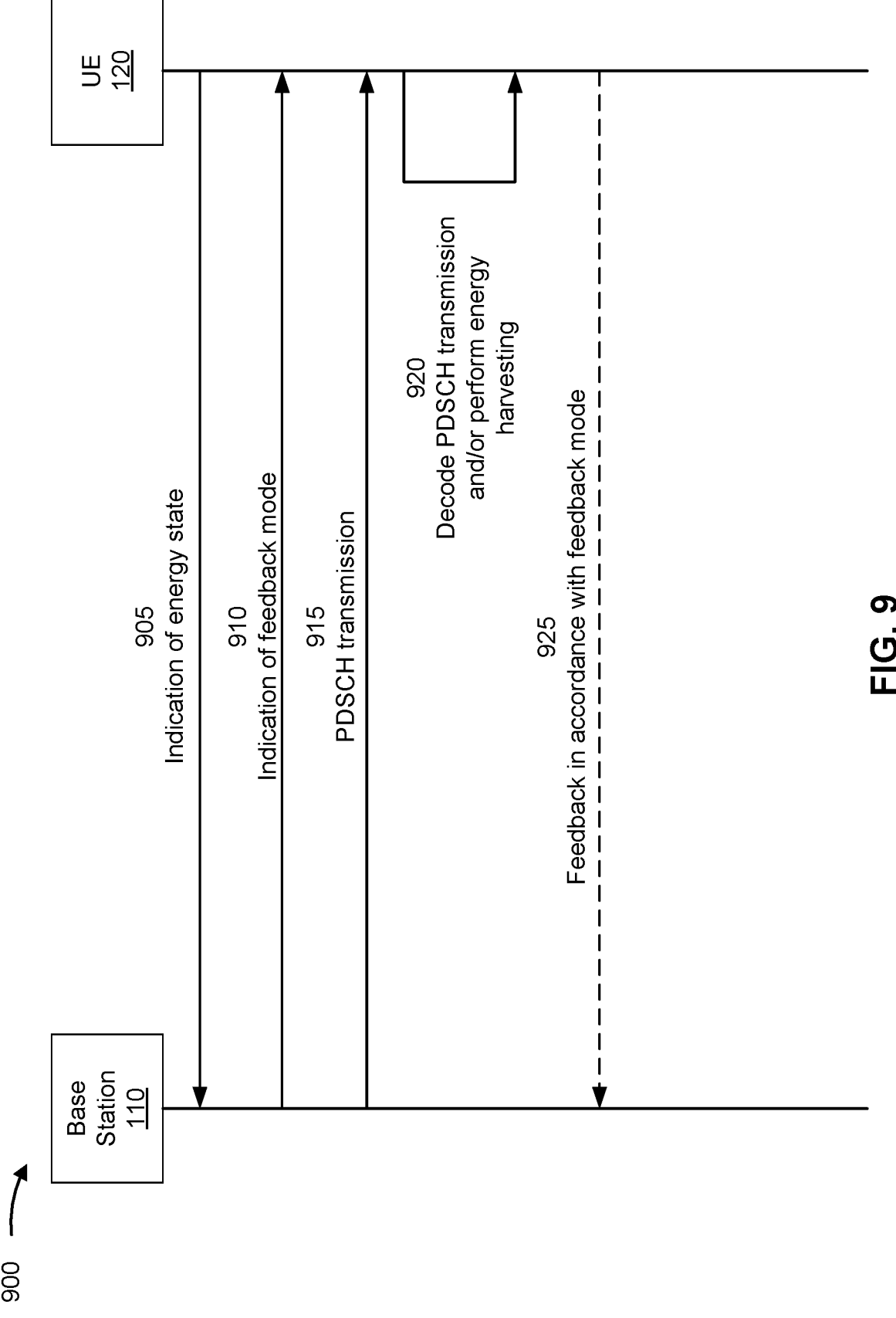
FIG. 9 is a diagram illustrating an example associated with selecting a feedback mode based at least in part on an energy state of a UE, in accordance with the present disclosure.

FIG. 9 is a diagram illustrating an example 800 associated with selecting a feedback mode based at least in part on an energy state of a UE, in accordance with the present disclosure. As shown in FIG. 9, example 900 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 9, and by reference number 905, the UE 120 may transmit, to the base station 110, an indication of an energy state of the UE 120. The base station 110 may receive the indication of the energy state from the UE 120. For example, the indication of the energy state may include a report of a battery status (e.g., battery status/level) of the UE 120. In some aspects, the indication of the energy state may be included in an RRC message, a MAC-CE, or UCI (e.g., in a PUCCH communication). In some aspects, the UE 120 may periodically transmit the indication of the energy state to the base station 120. In some aspects, the UE 120 may transmit the indication of the energy state to the base station 110 in connection with detecting that a reporting condition is satisfied. For example, the UE 120 may transmit the indication of the energy state to the base station 110 in connection with the battery level of the UE 120 reaching or falling below battery level threshold.

As further shown in FIG. 9, and by reference number 910, the base station 110 may transmit, to the UE 120, an indication of a feedback mode for the UE 120 based at least in part on the indication of the energy state of the UE 120. The UE 120 may receive the indication of the feedback mode from the base station 110. The feedback mode may be a feedback mode associated with HARQ-feedback for downlink communications (e.g., PDSCH) communications transmitted to the UE 120. In some aspects, the base station 110 may select the feedback mode for the UE 120 based at least in part on the energy state (e.g., battery status/level) of the UE 120. For example, the base station 110 may select an ACK/NACK feedback mode, an ACK-only feedback mode, a NACK-only feedback mode, or a HARQ-less feedback mode for the UE 120 based at least in part on the battery status/level of the UE 120. The indication, transmitted to the UE 120, may indicate the selected feedback mode (e.g., the ACK/NACK feedback mode, the ACK-only feedback mode, the NACK-only feedback mode, or the HARQ-less feedback mode) for the UE 120.

The ACK/NACK feedback mode may be a feedback mode in which the UE 120 transmits HARQ-ACK feedback to the base station 110 for downlink communications (e.g., PDSCH communications) successfully decoded by the UE 120 and transmits HARQ-NACK feedback to the base station 110 for downlink communications (e.g., PDSCH communication) unsuccessfully decoded by the UE 120. In some aspects, the base station 110 may select the ACK/NACK feedback mode for the UE 120 based at least in part on the battery level of the UE 120 satisfying (e.g., being greater than or equal to) a first threshold.

The ACK-only feedback mode may be a feedback mode in which the UE 120 transmits HARQ-ACK feedback to the base station 110 for downlink communications (e.g., PDSCH communications) successfully decoded by the UE 120, but the UE 120 does not transmit HARQ feedback to the base station 110 for downlink communications (e.g., PDSCH communications) unsuccessfully decoded by the UE 120. In some aspects, the base station 110 may select the ACK-only feedback mode for the UE 120 based at least in part on the battery level of the UE 120 not satisfying the first threshold.

The NACK-only feedback mode may be a feedback mode in which the UE 120 transmits HARQ-NACK feedback to the base station 110 for downlink communications (e.g., PDSCH communications) unsuccessfully decoded by the UE 120, but the UE 120 does not transmit HARQ feedback to the base station 110 for downlink communications (e.g., PDSCH communications) successfully decoded by the UE 120. In some aspects, the base station 110 may select the NACK-only feedback for the UE 120 mode based at least in part on the battery level of the UE 120 not satisfying the first threshold.

In some aspects, when the battery level of the UE 120 does not satisfy the first threshold, the base station 110 may select the ACK-only feedback mode or the NACK-only feedback mode for the UE 120 based at least in part on a target BLER and/or a downlink traffic pattern for the UE 120. For example, the base station 110 may select the feedback mode that provides great energy savings for the UE 120, among the ACK-only feedback or the NACK-only feedback mode. In some aspects, the base station 110 may select the NACK-only feedback mode in a case in which the target BLER does not satisfy (e.g., is less than or equal to) a first BLER threshold. For example, when the target BLER is small (e.g., 10%), the NACK-only feedback may result in more power savings for the UE 120 (e.g., as compared to ACK-only feedback) because only a small percentage (e.g., 10%) of downlink communications (e.g., PDSCH communications) to the UE 120 will result in NACK feedback. In some aspects, the base station 110 may select the ACK-only feedback mode in a case in which the target BLER satisfies (e.g., is greater than or equal to) a second BLER threshold. For example, the second BLER threshold may be the same or different from the first BLER threshold. In some aspects, the base station 110 may select the ACK-only feedback mode in connection with a determination that a low amount of downlink traffic is expected for the UE 120. For example, the base station 110 may select the ACK-only feedback mode in connection with a determination that an expected periodicity of downlink traffic arrivals for the UE 120 with respect to scheduled PDSCH occasions (e.g., SPS occasions) does not satisfy a threshold.

The HARQ-less feedback mode may be a feedback mode in which the UE 120 does not transmit HARQ-ACK feedback for downlink communications (e.g., PDSCH communications) successfully decoded by the UE 120 or HARQ-NACK feedback for downlink communications (e.g., PDSCH communications) unsuccessfully decoded by the UE 120. In some aspects, the base station 110 may select the HARQ-less feedback mode for the UE 120 based at least in part on the battery level of the UE 120 not satisfying (e.g., being less than or equal to) a second threshold. For example, the second threshold may be less than the first threshold. In some aspects, the base station 110 may select the ACK/NACK feedback mode for the UE 120 when the battery level of the UE 120 satisfies the first threshold, the base station 110 may select the ACK-only feedback mode or the NACK-only feedback mode for the UE 120 when the battery level of the UE 120 satisfies the second threshold and does not satisfy the second threshold, and the base station 120 may select the HARQ-less feedback mode for the UE 120 when the battery level of the UE 120 does not satisfy the second threshold.

As further shown in FIG. 9, and by reference number 915, the base station 110 may transmit, to the UE 120, a PDSCH transmission. For example, the PDSCH transmission may be scheduled via DCI in a PDCCH transmission, or the PDSCH transmission may be an SPS PDSCH transmission. The UE 120 may receive the PDSCH transmission.

As further shown in FIG. 9, and by reference number 920, the UE 120 may decode the PDSCH transmission, and/or the UE 120 may perform energy harvesting from the PDSCH transmission. In some aspects, the UE 120 may utilize a power splitting RF energy harvesting architecture. In this case, the UE 120 may decode the PDSCH transmission and/or perform energy harvesting from the PDSCH transmission in accordance with a power splitting factor ρ. For example, a first portion of the total received power P associated with the PDSCH transmission that is used for decoding (or attempting to decode) the PDSCH transmission may be $P_1 = \rho * P$, and a second portion of the total received power P associated with the PDSCH transmission that is used for energy harvesting may be $P_2 = (1-\rho) * P$.

As further shown in FIG. 9, and by reference number 930, the UE 120 may transmit or not transmit feedback for the PDSCH communication in accordance with the feedback mode indicated by the base station 110.

In some aspects, when the feedback mode indication received from the base station 110 indicates the ACK/NACK feedback mode, the UE 120 may operate in the ACK/NACK feedback mode. In this case, the UE 120 may transmit HARQ-ACK feedback to the base station 110 in a case in which the PDSCH transmission is successfully decoded by the UE 120, and the UE 120 may transmit HARQ-NACK feedback to the base station 110 in a case in which the PDSCH transmission is not successfully decoded by the UE 120.

In some aspects, when the feedback mode indication received from the base station 110 indicates the ACK-only feedback mode, the UE 120 may operate in the ACK-only feedback mode. In this case, the UE 120 may transmit HARQ-ACK feedback to the base station 110 in a case in which the PDSCH transmission is successfully decoded by the UE 120. However, when operating in the ACK-only feedback mode, the UE 120 may not transmit any feedback to the base station 110 in a case in which the PDSCH transmission is not successfully decoded by the UE 120. The ACK-only feedback may result in power saving for an energy harvesting device (e.g., the UE 120). If the PDSCH decoding is unsuccessful (e.g., a NACK is observed), or the UE 120 cannot begin the decoding process due to a lack of power, the base station 110 may retransmit the data in the PDSCH transmission, which may allow the PDSCH data to be decoded and may provide additional RF signals for energy harvesting. In addition, with extra retransmissions of PDSCH data, the UE 120 may perform energy harvesting using the entire signal for a PDSCH retransmission if the UE 120 does not need to decode the PDSCH retransmission. In some aspects, the ACK-only feedback may provide power savings for the UE 120 in cases in which the target BLER is high (e.g., greater than or equal to a target BLER threshold) and/or in cases in which the periodicity of expected traffic arrivals for the UE 120 is low relative to scheduled PDSCH occasions (e.g., SPS occasions) for the UE 120.

In some aspects, when the feedback mode indication received from the base station 110 indicates the NACK-only feedback mode, the UE 120 may operate in the NACK-only feedback mode. In this case, the UE 120 may transmit HARQ-NACK feedback to the base station 110 in a case in which the PDSCH transmission is not successfully decoded by the UE 120. However, when operating in the NACK-only feedback mode, the UE 120 may not transmit any feedback to the base station 110 in a case in which the PDSCH transmission is successfully decoded by the UE 120. The NACK-only feedback may result in power saving for an energy harvesting device (e.g., the UE 120). In some aspects, the NACK-only feedback may provide power savings for the UE 120 in cases in which the target BLER is small (e.g., less than or equal to a target BLER threshold) and NACK feedback is expected for a small percentage of PDSCH communications.

In some aspects, when the feedback mode indication received from the base station 110 indicates the HARQ-less feedback mode, the UE 120 may operate in the HARQ-less feedback mode. In this case, the UE 120 may transmit any feedback to the base station 110 for the PDSCH transmission.

In some aspects, the operations described above in connection with FIG. 9 with respect to downlink (e.g., PDSCH and/or PDCCH) transmissions and uplink (e.g., PUCCH) transmissions between the base station 110 and the UE 120 may be similarly performed by a first UE and a second UE for sidelink (e.g., PSSCH, PSCCH, and/or PSFCH) transmissions between the first UE and the second UE.

As indicated above, FIG. 9 is provided as an example. Other examples may differ from what is described with respect to FIG. 9.

Figure 10:
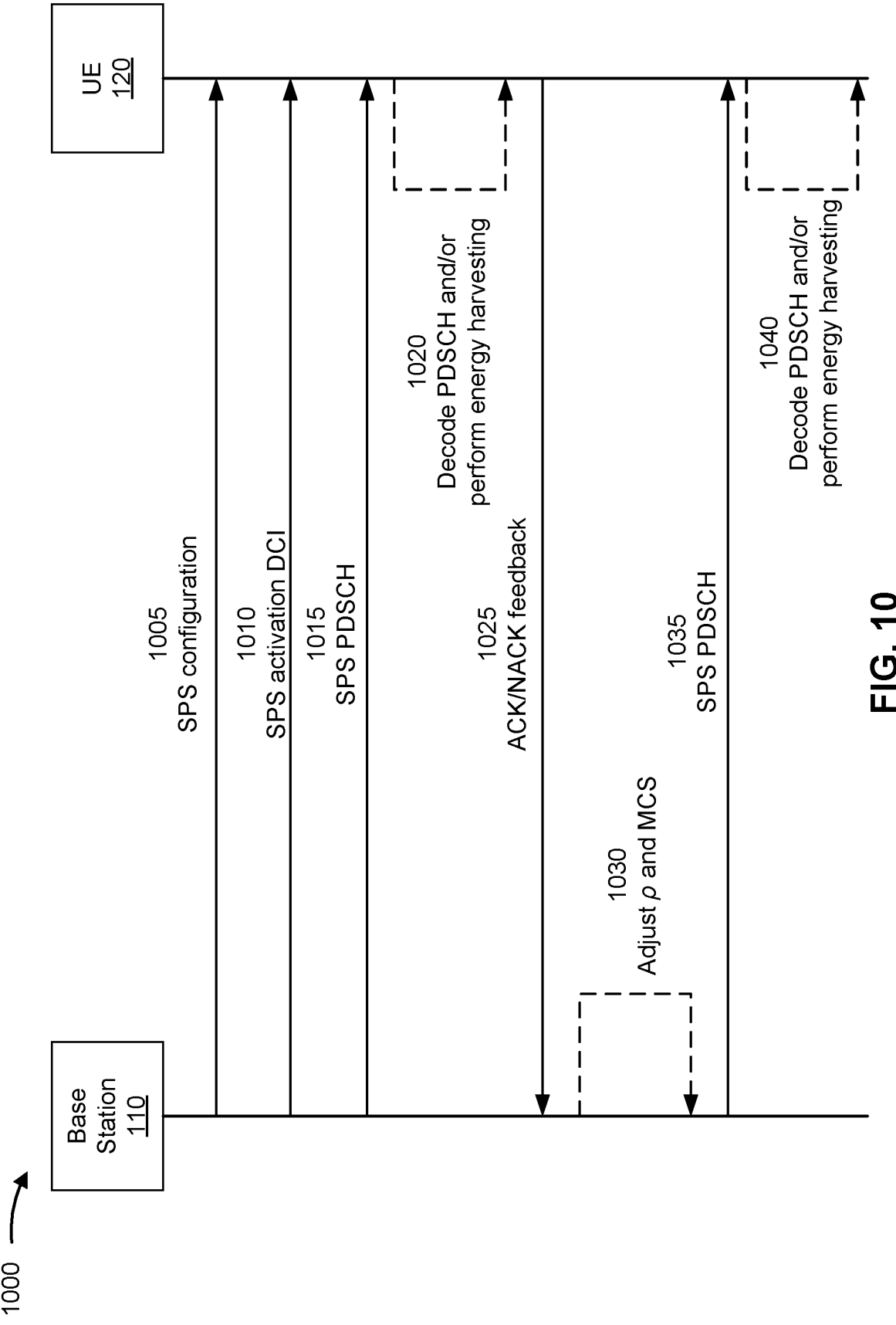
FIG. 10 is a diagram illustrating an example associated with adjusting SPS downlink transmission parameters for energy harvesting, in accordance with the present disclosure.

FIG. 10 is a diagram illustrating an example 1000 associated with adjusting SPS downlink transmission parameters for energy harvesting, in accordance with the present disclosure. As shown in FIG. 10, example 1000 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, the UE 120 may utilize a power-splitting RF energy harvesting architecture for RF energy harvesting from downlink communications (e.g., PDSCH transmissions) from the base station 110. The UE 120 may split the power of a downlink communication (e.g., PDSCH transmission) between decoding (e.g., data reception) and energy harvesting based at least in part on a data reception power splitting factor ρ and an energy harvesting power splitting factor 1−ρ. The data reception power splitting factor ρ (e.g., $0 \leq \rho \leq 1$) is the fraction of power allocated for decoding the downlink communication (e.g., PDSCH transmission), and the energy harvesting power splitting factor 1−ρ (e.g., $0 \leq 1-\rho \leq 1$) is the fraction of power allocated for RF energy harvesting from the downlink communication (e.g., PDSCH transmission).

As shown in FIG. 10, and by reference number 1005, the base station 110 may transmit, to the UE 120, an SPS configuration. The UE 120 may receive the SPS configuration. For example, the base station 110 may transmit the SPS configuration to the UE 120 via an RRC message. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions for the UE. The SPS configuration may also configure feedback resources for the UE to transmit HARQ-ACK/NACK feedback for SPS PDSCH communications received in the SPS occasions.

As further shown in FIG. 10, and by reference number 1010, the base station 110 may transmit SPS activation DCI to the UE 120 to activate the SPS configuration for the UE 120. The SPS activation DCI may include an indication of an initial MCS (MCS$_x$) for the SPS PDSCH transmissions. The SPS activation DCI may also indicate other transmission parameters, such as an RB allocation and/or antenna ports, for the SPS PDSCH transmissions in the scheduled SPS occasions. The UE 120 may receive the SPS activation DCI, and the UE 120 may begin monitoring the SPS occasions based at least in part on receiving the SPS activation DCI.

As further shown in FIG. 10, and by reference number 1015, the base station 110 may transmit an SPS PDSCH transmission to the UE 120 in a scheduled SPS occasion. The UE 120 may receive the SPS PDSCH transmission. In some aspects, the base station 110 may transmit a first SPS PDSCH transmission after the SPS activation DCI using the initial MCS (MCS$_x$) indicated in the SPS activation DCI.

As further shown in FIG. 10, and by reference number 1020, the UE 120 may decode the SPS PDSCH transmission and/or perform energy harvesting from the SPS PDSCH transmission in accordance with a power splitting factor $\rho$. For example, a first portion of the total received power P associated with the PDSCH transmission that is used for decoding (or attempting to decode) the PDSCH transmission may be $P_1=\rho^*P$, and a second portion of the total received power P associated with the PDSCH transmission that is used for energy harvesting may be $P_2=(1-\rho)^*P$. For a first SPS PDSCH transmission, the UE 120 may use an initial power splitting factor $\rho_0$.

As further shown in FIG. 10, and by reference number 1025, the UE 120 may transmit, to the base station 110, ACK/NACK feedback for the SPS PDSCH. The base station 110 may receive the ACK/NACK feedback. The UE 120 may determine whether the SPS PDSCH transmission is successfully decoded (e.g., an ACK is observed) or the SPS PDSCH transmission is not successfully decoded (e.g., a NACK is observed). In the case in which the SPS PDSCH transmission is successfully decoded, the UE 120 may transmit the ACK feedback (e.g., HARQ-ACK) to the base station 110. In the case in which the SPS PDSCH transmission is not successfully decoded, the UE 120 may transmit the NACK feedback to the base station 110. In some aspects, the UE 120 may also transmit, to the base station 110, an indication of the power splitting factor $\rho$ used by the UE 120. In some aspects, the UE 120 may transmit an indication of the power splitting factor $\rho$ used by the UE 120 with the ACK/NACK feedback for each SPS PDSCH transmission. In some aspects, the UE 120 may transmit an indication of the initial power splitting factor $\rho$, used by the UE 120 for the first SPS PDSCH transmission, with the ACK/NACK feedback for the first SPS PDSCH transmission.

As further shown in FIG. 10, and by reference number 1030, the base station 110 may adjust the power splitting factor $\rho$ and the MCS based at least in part on the NACK and/or ACK feedback received from the UE 120. In some aspects, the base station 110 may adjust the power splitting factor $\rho$ and the MCS in connection with receiving NACK feedback from the UE 120. In this case, each time the base station 110 receives NACK feedback for an SPS PDSCH transmission, the base station 110 may adjust the power splitting factor $\rho$ and the MCS used for that SPS PDSCH transmission. For example, in connection with receiving NACK feedback, the base station 110 may increase a current power splitting factor $\rho$ by a power splitting adjustment value $\Delta_\rho$ and decrease a current MCS by an MCS adjustment value $\Delta_{MCS}$. The base station 110 may apply the adjustments to the power splitting factor $\rho$ and the MCS each time NACK feedback is received after an SPS PDSCH transmission. For example, after N SPS PDSCH transmissions with K ACKs and L NACKs received by the base station 110, the adjusted MCS may be $MCS_x-L\Delta_{MCS}$, and the adjusted power splitting factor $\rho$ may be the initial power splitting factor $\rho_0+L\Delta_\rho$. The MCS may be constrained to not be less than a minimum MCS value (e.g., MCS0), and the power splitting factor $\rho$ may be constrained such that $0 \le \rho \le 1$.

In some aspects, the base station 110 may adjust the power splitting factor $\rho$ and the MCS in connection with receiving ACK feedback, as well as in connection with receiving NACK feedback. In this case, the base station 110 may adjust the power splitting factor $\rho$ and the MCS after each SPS PDSCH transmission. In connection with receiving NACK feedback, the base station 110 may increase the current power splitting factor $\rho$ by a power splitting adjustment value $\Delta_\rho$ and decrease the current MCS by an MCS adjustment value $\Delta_{MCS}$. In connection with receiving ACK feedback, the base station 110 may decrease the current power splitting factor $\rho$ by the power splitting adjustment value $\Delta_\rho$ and decrease the current MCS by the MCS adjustment value $\Delta_{MCS}$. For example, after N SPS PDSCH transmissions with K ACKs and L NACKs received by the base station 110, the adjusted MCS may be $MCS_x-L\Delta_{MCS}+K\Delta_{MCS}$, and the adjusted power splitting factor $\rho$ may be the initial power splitting factor $\rho_0+L\Delta_\rho-K\Delta_\rho$. The MCS may be constrained to not be less than a minimum MCS value (e.g., MCS0) or greater than a maximum MCS value (e.g., MCS28), and the power splitting factor $\rho$ may be constrained such that $0 \le \rho \le 1$.

In some aspects, $\Delta_\rho$ and $\Delta_{MCS}$ may be RRC or MAC-CE configured parameters. In some aspects, $\Delta_\rho$ and $\Delta_{MCS}$ may be values configured in the SPS configuration. In some aspects, the UE 120 may transmit, to the base station 110 (e.g., in UE assistance information) recommended values for $\Delta_\rho$ and $\Delta_{MCS}$.

As further shown in FIG. 10, and by reference number 1035, the base station 110 may transmit a next SPS PDSCH transmission using the adjusted power splitting factor $\rho$ and the adjusted MCS. The UE 120 may receive the next SPS PDSCH transmission. As shown by reference number 1040, the UE 120 may decode the SPS PDSCH transmission and/or perform energy harvesting from the SPS PDSCH transmission in accordance with the adjusted power splitting factor $\rho$.

As described above, the base station 110 may update the power splitting factor $\rho$ and the MCS between SPS PDSCH transmissions. As a result, the base station 110 can improve the efficiency of energy harvesting and/or the reliability of SPS PDSCH decoding. In addition, the base station 110 may adjust the MCS between SPS PDSCH transmissions based at least in part on an MCS value signaled in the SPS activation DCI.

In some aspects, the operations described above in connection with FIG. 10 with respect to downlink (e.g., PDSCH and/or PDCCH) transmissions and uplink (e.g., PUCCH) transmissions between the base station 110 and the UE 120 may be similarly performed by a first UE and a second UE for sidelink (e.g., PSSCH, PSCCH, and/or PSFCH) transmissions between the first UE and the second UE.

As indicated above, FIG. 10 is provided as an example. Other examples may differ from what is described with respect to FIG. 10.

Figure 11:
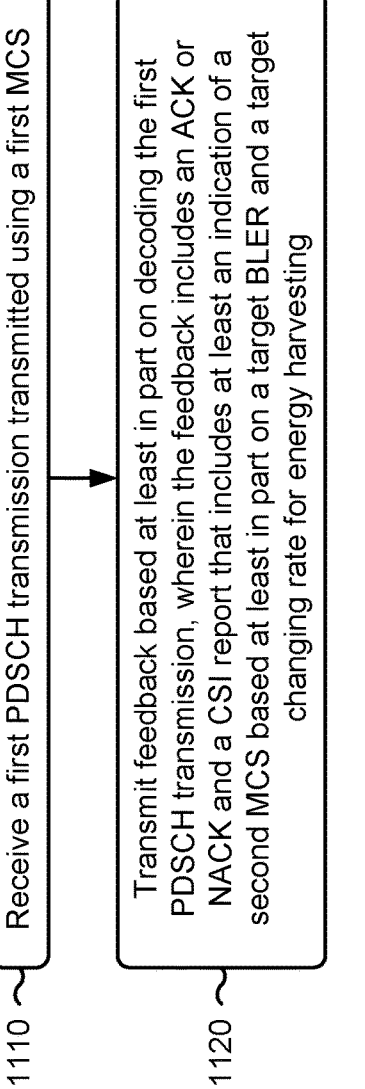
FIGS. 11-12 are diagrams illustrating example processes associated with decoding-based CSI for energy harvesting, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with decoding-based CSI for energy harvesting.

As shown in FIG. 11, in some aspects, process 1100 may include receiving, from a base station, a first PDSCH transmission transmitted using a first MCS (block 1110). For example, the UE (e.g., using communication manager 140 and/or reception component 1302, depicted in FIG. 13) may receive, from a base station, a first PDSCH transmission transmitted using a first MCS, as described above.

As further shown in FIG. 11, in some aspects, process 1100 may include transmitting, to the base station, feedback based at least in part on decoding the first PDSCH transmission, wherein the feedback includes an ACK or NACK and a CSI report that includes at least an indication of a second MCS based at least in part on a target BLER and a target charging rate for energy harvesting (block 1120). For example, the UE (e.g., using communication manager 140 and/or transmission component 1304, depicted in FIG. 13) may transmit, to the base station, feedback based at least in part on decoding the first PDSCH transmission, wherein the feedback includes an ACK or NACK and a CSI report that includes at least an indication of a second MCS based at least in part on a target BLER and a target charging rate for energy harvesting, as described above.

Process 1100 may include additional aspects, such as any single aspect or any combination of aspects described below and/or in connection with one or more other processes described elsewhere herein.

In a first aspect, process 1100 includes receiving, from the base station, a second PDSCH transmission transmitted using the second MCS.

In a second aspect, alone or in combination with the first aspect, process 1100 includes decoding the second PDSCH transmission using a first portion of a total received power associated with the second PDSCH transmission, and performing energy harvesting from the second PDSCH transmission using a second portion of the total received power associated with the second PDSCH transmission, and the first portion and the second portion of the total received power are based at least in part on a power splitting factor associated with the target charging rate.

In a third aspect, alone or in combination with one or more of the first and second aspects, the second MCS is based at least in part on an adjusted SINR associated with the target charging rate and the target BLER.

In a fourth aspect, alone or in combination with one or more of the first through third aspects, the adjusted SINR is based at least in part on a measured SINR of the first PDSCH transmission and a power splitting factor associated with the target charging rate.

In a fifth aspect, alone or in combination with one or more of the first through fourth aspects, the indication of the second MCS includes an indication of a difference between the first MCS and the second MCS.

In a sixth aspect, alone or in combination with one or more of the first through fifth aspects, the indication of the second MCS includes an indication of an index value of a plurality of index values, each associated with a respective configuration of an MCS and a power splitting factor for energy harvesting.

In a seventh aspect, alone or in combination with one or more of the first through sixth aspects, process 1100 includes receiving, from the base station, configuration information including an indication of the plurality of index values and the respective configuration of the MCS and the power splitting factor associated with each index value of the plurality of index values.

In an eighth aspect, alone or in combination with one or more of the first through seventh aspects, the target BLER is associated with at least one of an energy harvesting mode or an energy state of the UE.

In a ninth aspect, alone or in combination with one or more of the first through eighth aspects, process 1100 includes transmitting, to the base station, an indication of the at least one of the energy harvesting mode or the energy state of the UE, and receiving, from the base station, configuration information including an indication of the target BLER associated with the at least one of the energy harvesting mode or the energy state of the UE.

In a tenth aspect, alone or in combination with one or more of the first through ninth aspects, process 1100 includes receiving, from the base station, configuration information including an indication of a plurality of target BLERs for a same priority, the plurality of target BLERs are associated with respective energy harvesting modes or energy harvesting states, and the target BLER is one of the plurality of target BLERs.

In an eleventh aspect, alone or in combination with one or more of the first through tenth aspects, receiving the first PDSCH transmission includes receiving, in a first time window, one or more first PDSCH transmissions transmitted using the first MCS, and the CSI report includes CSI associated with the one or more first PDSCH transmissions in the first time window.

In a twelfth aspect, alone or in combination with one or more of the first through eleventh aspects, the CSI report indicates at least one of pathloss information associated with the one or more first PDSCH transmissions, pathloss difference information between the pathloss information associated with the one or more first PDSCH transmissions and previous pathloss information, the target charging rate, a difference between the target charging rate and a previous charging rate, a target power splitting factor for energy harvesting, a difference between the target power splitting factor and a previous power splitting factor, a plurality of MCS levels associated with respective target charging rates or target power splitting factors, a predicted energy state for the UE, or a predicted power profile for the UE.

In a thirteenth aspect, alone or in combination with one or more of the first through twelfth aspects, the CSI report indicates at least one of a recommended component carrier and bandwidth part pair, a maximum quantity of repetitions for uplink communications, a maximum MCS level, a maximum quantity of component carriers and active bandwidth parts, a maximum quantity of CSI processes, a maximum quantity of transmit and receive antennas, or a maximum quantity of low-density parity-check code iterations.

In a fourteenth aspect, alone or in combination with one or more of the first through thirteenth aspects, process 1100 includes receiving, in a second time window, one or more second PDSCH transmissions based at least in part on the CSI report including the CSI associated with the one or more first PDSCH transmissions in the first time window.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
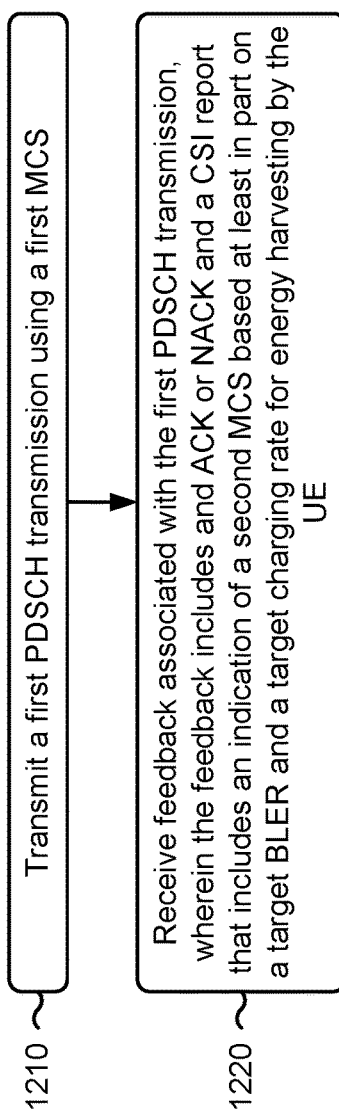

FIG. 12 is a diagram illustrating an example process 1200 performed, for example, by a base station, in accordance with the present disclosure. Example process 1200 is an example where the base station (e.g., base station 110) performs operations associated with decoding-based CSI for energy harvesting.

As shown in FIG. 12, in some aspects, process 1200 may include transmitting, to a UE, a first PDSCH transmission using a first MCS (block 1210). For example, the base station (e.g., using communication manager 150 and/or transmission component 1404, depicted in FIG. 14) may transmit, to a UE, a first PDSCH transmission using a first MCS, as described above.

As further shown in FIG. 12, in some aspects, process 1200 may include receiving, from the UE, feedback associated with the first PDSCH transmission, wherein the feedback includes an ACK or NACK and a CSI report that includes at least an indication of a second MCS based at least in part on a target BLER and a target charging rate for energy harvesting by the UE (block 1220). For example, the base station (e.g., using communication manager 150 and/or reception component 1402, depicted in FIG. 14) may receive, from the UE, feedback associated with the first PDSCH transmission, wherein the feedback includes an ACK or NACK and a CSI report that includes at least an indication of a second MCS based at least in part on a target BLER and a target charging rate for energy harvesting by the UE, as described above.

Process 1200 may include additional aspects, such as any single aspect or any combination of aspects described below and/or in connection with one or more other processes described elsewhere herein.

In a first aspect, process 1200 includes transmitting, to the UE, a second PDSCH transmission using the second MCS.

In a second aspect, the second MCS is based at least in part on an adjusted SINR associated with the target charging rate and the target BLER.

In a third aspect, the adjusted SINR is based at least in part on a measured SINR of the first PDSCH transmission and a power splitting factor associated with the target charging rate.

In a fourth aspect, the indication of the second MCS includes an indication of a difference between the first MCS and the second MCS.

In a fifth aspect, the indication of the second MCS includes an indication of an index value of a plurality of index values, each associated with a respective configuration of an MCS and a power splitting factor for energy harvesting.

In a sixth aspect, process 1200 includes transmitting, to the UE, configuration information including an indication of the plurality of index values and the respective configuration of the MCS and the power splitting factor associated with each index value of the plurality of index values.

In a seventh aspect, the target BLER is associated with at least one of an energy harvesting mode or an energy state of the UE.

In an eighth aspect, process 1200 includes receiving, from the UE, an indication of the at least one of the energy harvesting mode or the energy state of the UE, and transmitting, to the UE, configuration information including an indication of the target BLER associated with the at least one of the energy harvesting mode or the energy state of the UE.

In a ninth aspect, process 1200 includes transmitting, to the UE, configuration information including an indication of a plurality of target BLERs for a same priority, the plurality of target BLERs are associated with respective energy harvesting modes or energy harvesting states, and the target BLER is one of the plurality of target BLERs.

In a tenth aspect, transmitting the first PDSCH transmission includes transmitting, in a first time window, one or more first PDSCH transmissions using the first MCS, and the CSI report includes CSI associated with the one or more first PDSCH transmissions in the first time window.

In an eleventh aspect, the CSI report indicates at least one of pathloss information associated with the one or more first PDSCH transmissions, pathloss difference information between the pathloss information associated with the one or more first PDSCH transmissions and previous pathloss information, the target charging rate, a difference between the target charging rate and a previous charging rate, a target power splitting factor for energy harvesting, a difference between the target power splitting factor and a previous power splitting factor, a plurality of MCS levels associated with respective target charging rates or target power splitting factors, a predicted energy state for the UE, or a predicted power profile for the UE.

In a twelfth aspect, the CSI report indicates at least one of a recommended component carrier and bandwidth part pair, a maximum quantity of repetitions for uplink communications, a maximum MCS level, a maximum quantity of component carriers and active bandwidth parts, a maximum quantity of CSI processes, a maximum quantity of transmit and receive antennas, or a maximum quantity of low-density parity-check code iterations.

In a thirteenth aspect, process 1200 includes transmitting, in a second time window, one or more second PDSCH transmissions based at least in part on the CSI report including the CSI associated with the one or more first PDSCH transmissions in the first time window.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
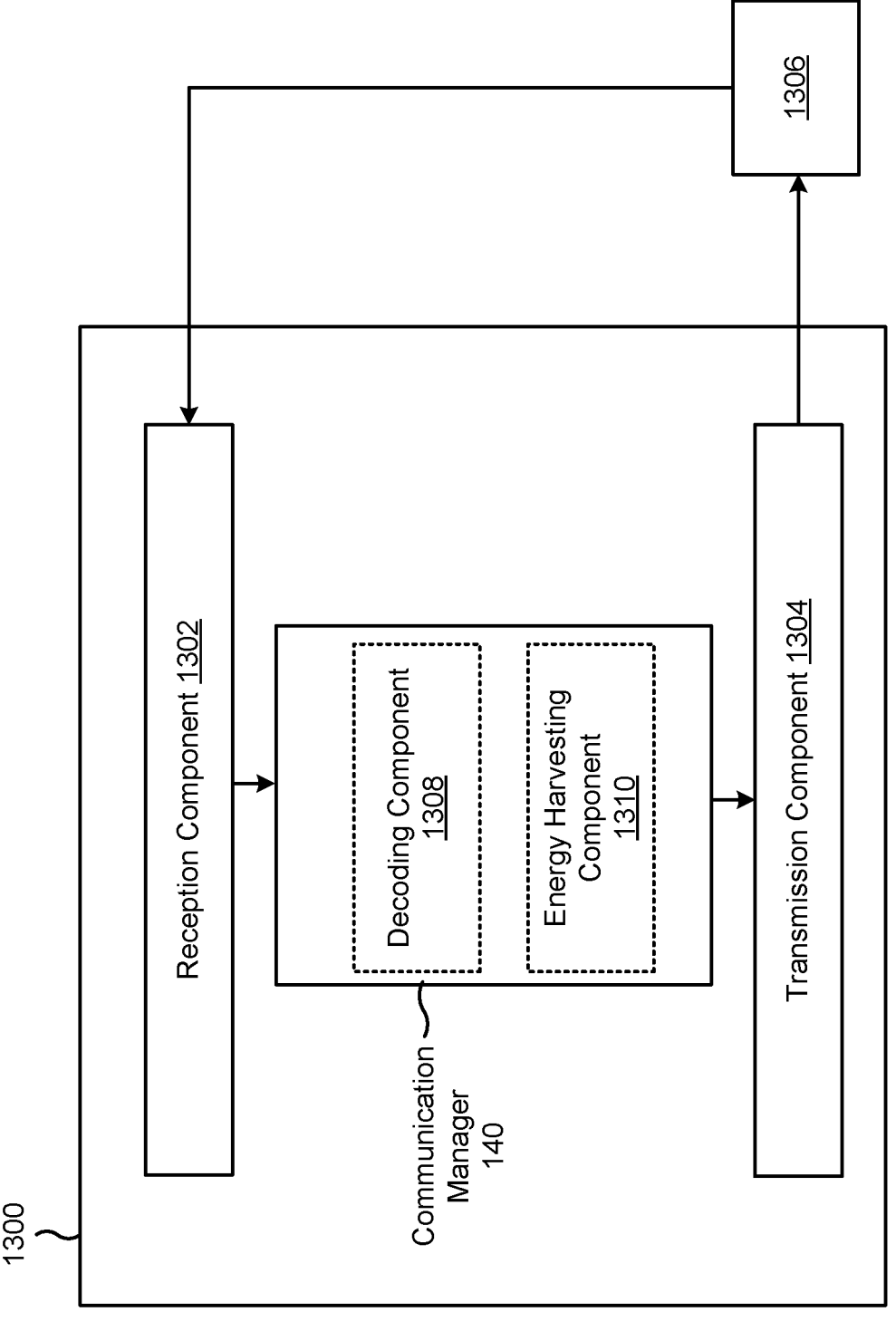
FIGS. 13-14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a decoding component 1308 and/or an energy harvesting component 1310, among other examples.

In some aspects, the apparatus 1300 may be configured to perform one or more operations described herein in connection with FIGS. 7-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive, from a base station, a first PDSCH transmission transmitted using a first MCS. The transmission component 1304 may transmit, to the base station, feedback based at least in part on decoding the first PDSCH transmission, wherein the feedback includes an ACK or NACK and a CSI report that includes at least an indication of a second MCS based at least in part on a target BLER and a target charging rate for energy harvesting.

The reception component 1302 may receive, from the base station, a second PDSCH transmission transmitted using the second MCS.

The decoding component 1308 may decode the second PDSCH transmission using a first portion of a total received power associated with the second PDSCH transmission.

The energy harvesting component 1310 may perform energy harvesting from the second PDSCH transmission using a second portion of the total received power associated with the second PDSCH transmission, wherein the first portion and the second portion of the total received power are based at least in part on a power splitting factor associated with the target charging rate.

The reception component 1302 may receive, from the base station, configuration information including an indication of the plurality of index values and the respective configuration of the MCS and the power splitting factor associated with each index value of the plurality of index values.

The transmission component 1304 may transmit, to the base station, an indication of the at least one of the energy harvesting mode or the energy state of the UE.

The reception component 1302 may receive, from the base station, configuration information including an indication of the target BLER associated with the at least one of the energy harvesting mode or the energy state of the UE.

The reception component 1302 may receive, from the base station, configuration information including an indication of a plurality of target BLERs for a same priority, wherein the plurality of target BLERs are associated with respective energy harvesting modes or energy harvesting states, and wherein the target BLER is one of the plurality of target BLERs.

The reception component 1302 may receive, in a second time window, one or more second PDSCH transmissions based at least in part on the CSI report including the CSI associated with the one or more first PDSCH transmissions in the first time window.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
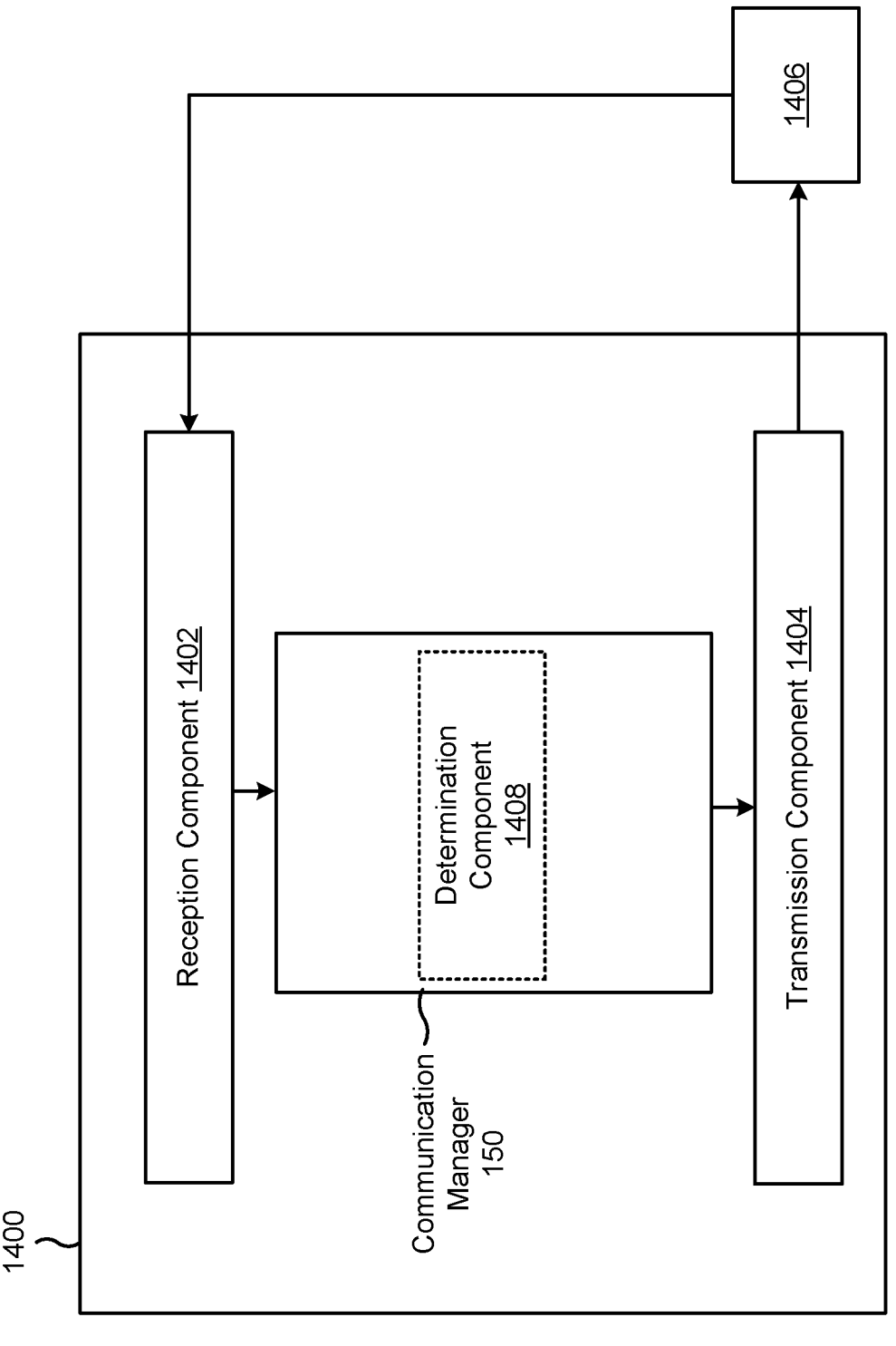

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a determination component 1408, among other examples.

In some aspects, the apparatus 1400 may be configured to perform one or more operations described herein in connection with FIGS. 7-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit, to a UE, a first PDSCH transmission using a first MCS. The reception component 1402 may receive, from the UE, feedback associated with the first PDSCH transmission, wherein the feedback includes an ACK or NACK and a CSI report that includes at least an indication of a second MCS based at least in part on a target BLER and a target charging rate for energy harvesting by the UE.

The determination component 1408 may determine the first MCS and/or the target BLER.

The transmission component 1404 may transmit, to the UE, a second PDSCH transmission using the second MCS.

The transmission component 1404 may transmit, to the UE, configuration information including an indication of the plurality of index values and the respective configuration of the MCS and the power splitting factor associated with each index value of the plurality of index values.

The reception component 1402 may receive, from the UE, an indication of the at least one of the energy harvesting mode or the energy state of the UE.

The transmission component 1404 may transmit, to the UE, configuration information including an indication of the target BLER associated with the at least one of the energy harvesting mode or the energy state of the UE.

The transmission component 1404 may transmit, to the UE, configuration information including an indication of a plurality of target BLERs for a same priority, wherein the plurality of target BLERs are associated with respective energy harvesting modes or energy harvesting states, and wherein the target BLER is one of the plurality of target BLERs.

The transmission component 1404 may transmit, in a second time window, one or more second PDSCH transmissions based at least in part on the CSI report including the CSI associated with the one or more first PDSCH transmissions in the first time window.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a base station, a first physical downlink shared channel (PDSCH) transmission transmitted using a first modulation and coding scheme (MCS); and transmitting, to the base station, feedback based at least in part on decoding the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting.

Aspect 2: The method of Aspect 1, further comprising: receiving, from the base station, a second PDSCH transmission transmitted using the second MCS.

Aspect 3: The method of Aspect 2, further comprising: decoding the second PDSCH transmission using a first portion of a total received power associated with the second PDSCH transmission; and performing energy harvesting from the second PDSCH transmission using a second portion of the total received power associated with the second PDSCH transmission, wherein the first portion and the second portion of the total received power are based at least in part on a power splitting factor associated with the target charging rate.

Aspect 4: The method of any of Aspects 1-3, wherein the second MCS is based at least in part on an adjusted signal-to-interference-plus-noise ratio (SINR) associated with the target charging rate and the target BLER.

Aspect 5: The method of Aspect 4, wherein the adjusted SINR is based at least in part on a measured SINR of the first PDSCH transmission and a power splitting factor associated with the target charging rate.

Aspect 6: The method of any of Aspects 1-5, wherein the indication of the second MCS includes an indication of a difference between the first MCS and the second MCS.

Aspect 7: The method of any of Aspects 1-5, wherein the indication of the second MCS includes an indication of an index value of a plurality of index values, each associated with a respective configuration of an MCS and a power splitting factor for energy harvesting.

Aspect 8: The method of Aspect 7, further comprising: receiving, from the base station, configuration information including an indication of the plurality of index values and the respective configuration of the MCS and the power splitting factor associated with each index value of the plurality of index values.

Aspect 9: The method of any of Aspects 1-8, wherein the target BLER is associated with at least one of an energy harvesting mode or an energy state of the UE.

Aspect 10: The method of Aspect 9, further comprising: transmitting, to the base station, an indication of the at least one of the energy harvesting mode or the energy state of the UE; and receiving, from the base station, configuration information including an indication of the target BLER associated with the at least one of the energy harvesting mode or the energy state of the UE.

Aspect 11: The method of Aspect 9, further comprising: receiving, from the base station, configuration information including an indication of a plurality of target BLERs for a same priority, wherein the plurality of target BLERs are associated with respective energy harvesting modes or energy harvesting states, and wherein the target BLER is one of the plurality of target BLERs.

Aspect 12: The method of any of Aspects 1-11, wherein receiving the first PDSCH transmission comprises: receiving, in a first time window, one or more first PDSCH transmissions transmitted using the first MCS, wherein the CSI report includes CSI associated with the one or more first PDSCH transmissions in the first time window.

Aspect 13: The method of Aspect 12, wherein the CSI report indicates at least one of pathloss information associated with the one or more first PDSCH transmissions, pathloss difference information between the pathloss information associated with the one or more first PDSCH transmissions and previous pathloss information, the target charging rate, a difference between the target charging rate and a previous charging rate, a target power splitting factor for energy harvesting, a difference between the target power splitting factor and a previous power splitting factor, a plurality of MCS levels associated with respective target charging rates or target power splitting factors, a predicted energy state for the UE, or a predicted power profile for the UE.

Aspect 14: The method of any of Aspects 12-13, wherein the CSI report indicates at least one of a recommended component carrier and bandwidth part pair, a maximum quantity of repetitions for uplink communications, a maximum MCS level, a maximum quantity of component carriers and active bandwidth parts, a maximum quantity of CSI processes, a maximum quantity of transmit and receive antennas, or a maximum quantity of low-density parity-check code iterations.

Aspect 15: The method of any of Aspects 12-14, further comprising: receiving, in a second time window, one or more second PDSCH transmissions based at least in part on the CSI report including the CSI associated with the one or more first PDSCH transmissions in the first time window.

Aspect 16: A method of wireless communication performed by a base station, comprising: transmitting, to a user equipment (UE), a first physical downlink shared channel (PDSCH) transmission using a first modulation and coding scheme (MCS); and receiving, from the UE, feedback associated with the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting by the UE.

Aspect 17: The method of Aspect 16, further comprising: transmitting, to the UE, a second PDSCH transmission using the second MCS.

Aspect 18: The method of any of Aspects 16-17, wherein the second MCS is based at least in part on an adjusted signal-to-interference-plus-noise ratio (SINR) associated with the target charging rate and the target BLER.

Aspect 19: The method of Aspect 18, wherein the adjusted SINR is based at least in part on a measured SINR of the first PDSCH transmission and a power splitting factor associated with the target charging rate.

Aspect 20: The method of any of Aspects 16-19, wherein the indication of the second MCS includes an indication of a difference between the first MCS and the second MCS.

Aspect 21: The method of any of Aspects 16-19, wherein the indication of the second MCS includes an indication of an index value of a plurality of index values, each associated with a respective configuration of an MCS and a power splitting factor for energy harvesting.

Aspect 22: The method of Aspect 21, further comprising: transmitting, to the UE, configuration information including an indication of the plurality of index values and the respective configuration of the MCS and the power splitting factor associated with each index value of the plurality of index values.

Aspect 23: The method of any of Aspects 16-22, wherein the target BLER is associated with at least one of an energy harvesting mode or an energy state of the UE.

Aspect 24: The method of Aspect 23, further comprising: receiving, from the UE, an indication of the at least one of the energy harvesting mode or the energy state of the UE; and transmitting, to the UE, configuration information including an indication of the target BLER associated with the at least one of the energy harvesting mode or the energy state of the UE.

Aspect 25: The method of Aspect 23, further comprising: transmitting, to the UE, configuration information including an indication of a plurality of target BLERs for a same priority, wherein the plurality of target BLERs are associated with respective energy harvesting modes or energy harvesting states, and wherein the target BLER is one of the plurality of target BLERs.

Aspect 26: The method of any of Aspects 16-25, wherein transmitting the first PDSCH transmission comprises: transmitting, in a first time window, one or more first PDSCH transmissions using the first MCS, wherein the CSI report includes CSI associated with the one or more first PDSCH transmissions in the first time window.

Aspect 27: The method of Aspect 26, wherein the CSI report indicates at least one of pathloss information associated with the one or more first PDSCH transmissions, pathloss difference information between the pathloss information associated with the one or more first PDSCH transmissions and previous pathloss information, the target charging rate, a difference between the target charging rate and a previous charging rate, a target power splitting factor for energy harvesting, a difference between the target power splitting factor and a previous power splitting factor, a plurality of MCS levels associated with respective target charging rates or target power splitting factors, a predicted energy state for the UE, or a predicted power profile for the UE.

Aspect 28: The method of any of Aspects 26-27, wherein the CSI report indicates at least one of a recommended component carrier and bandwidth part pair, a maximum quantity of repetitions for uplink communications, a maximum MCS level, a maximum quantity of component carriers and active bandwidth parts, a maximum quantity of CSI processes, a maximum quantity of transmit and receive antennas, or a maximum quantity of low-density parity-check code iterations.

Aspect 29: The method of any of Aspects 26-28, further comprising: transmitting, in a second time window, one or more second PDSCH transmissions based at least in part on the CSI report including the CSI associated with the one or more first PDSCH transmissions in the first time window.

Aspect 30: An apparatus for wireless communication at a device, comprising a processor; memory coupled with the processor; and instructions stored in the memory and executable by the processor to cause the apparatus to perform the method of one or more of Aspects 1-15.

Aspect 31: A device for wireless communication, comprising a memory and one or more processors coupled to the memory, the one or more processors configured to perform the method of one or more of Aspects 1-15.

Aspect 32: An apparatus for wireless communication, comprising at least one means for performing the method of one or more of Aspects 1-15.

Aspect 33: A non-transitory computer-readable medium storing code for wireless communication, the code comprising instructions executable by a processor to perform the method of one or more of Aspects 1-15.

Aspect 34: A non-transitory computer-readable medium storing a set of instructions for wireless communication, the set of instructions comprising one or more instructions that, when executed by one or more processors of a device, cause the device to perform the method of one or more of Aspects 1-15.

Aspect 35: An apparatus for wireless communication at a device, comprising a processor; memory coupled with the processor; and instructions stored in the memory and executable by the processor to cause the apparatus to perform the method of one or more of Aspects 16-29.

Aspect 36: A device for wireless communication, comprising a memory and one or more processors coupled to the memory, the one or more processors configured to perform the method of one or more of Aspects 16-29.

Aspect 37: An apparatus for wireless communication, comprising at least one means for performing the method of one or more of Aspects 16-29.

Aspect 38: A non-transitory computer-readable medium storing code for wireless communication, the code comprising instructions executable by a processor to perform the method of one or more of Aspects 16-29.

Aspect 39: A non-transitory computer-readable medium storing a set of instructions for wireless communication, the set of instructions comprising one or more instructions that, when executed by one or more processors of a device, cause the device to perform the method of one or more of Aspects 16-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive, from a base station, a first physical downlink shared channel (PDSCH) transmission transmitted using a first modulation and coding scheme (MCS); and transmit, to the base station, feedback based at least in part on decoding the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting.

2. The UE of claim 1, wherein the one or more processors are further configured to:

receive, from the base station, a second PDSCH transmission transmitted using the second MCS.

3. The UE of claim 2, wherein the one or more processors are further configured to:

decode the second PDSCH transmission using a first portion of a total received power associated with the second PDSCH transmission; and perform energy harvesting from the second PDSCH transmission using a second portion of the total received power associated with the second PDSCH transmission, wherein the first portion and the second portion of the total received power are based at least in part on a power splitting factor associated with the target charging rate.

4. The UE of claim 1, wherein the second MCS is based at least in part on an adjusted signal-to-interference-plus-noise ratio (SINR) associated with the target charging rate and the target BLER.

5. The UE of claim 4, wherein the adjusted SINR is based at least in part on a measured SINR of the first PDSCH transmission and a power splitting factor associated with the target charging rate.

6. The UE of claim 1, wherein the indication of the second MCS includes an indication of a difference between the first MCS and the second MCS.

7. The UE of claim 1, wherein the indication of the second MCS includes an indication of an index value of a plurality of index values, each associated with a respective configuration of an MCS and a power splitting factor for energy harvesting.

8. The UE of claim 7, wherein the one or more processors are further configured to:

receive, from the base station, configuration information including an indication of the plurality of index values and the respective configuration of the MCS and the power splitting factor associated with each index value of the plurality of index values.

9. The UE of claim 1, wherein the target BLER is associated with at least one of an energy harvesting mode or an energy state of the UE.

10. The UE of claim 9, wherein the one or more processors are further configured to:

transmit, to the base station, an indication of the at least one of the energy harvesting mode or the energy state of the UE; and receive, from the base station, configuration information including an indication of the target BLER associated with the at least one of the energy harvesting mode or the energy state of the UE.

11. The UE of claim 9, wherein the one or more processors are further configured to:

receive, from the base station, configuration information including an indication of a plurality of target BLERs for a same priority, wherein the plurality of target BLERs are associated with respective energy harvesting modes or energy harvesting states, and wherein the target BLER is one of the plurality of target BLERs.

12. The UE of claim 1, wherein the one or more processors, to receive the first PDSCH transmission, are configured to:

receive, in a first time window, one or more first PDSCH transmissions transmitted using the first MCS, wherein the CSI report includes CSI associated with the one or more first PDSCH transmissions in the first time window.

13. The UE of claim 12, wherein the CSI report indicates at least one of pathloss information associated with the one or more first PDSCH transmissions, pathloss difference information between the pathloss information associated with the one or more first PDSCH transmissions and previous pathloss information, the target charging rate, a difference between the target charging rate and a previous charging rate, a target power splitting factor for energy harvesting, a difference between the target power splitting factor and a previous power splitting factor, a plurality of MCS levels associated with respective target charging rates or target power splitting factors, a predicted energy state for the UE, or a predicted power profile for the UE.

14. The UE of claim 12, wherein the CSI report indicates at least one of a recommended component carrier and bandwidth part pair, a maximum quantity of repetitions for uplink communications, a maximum MCS level, a maximum quantity of component carriers and active bandwidth parts, a maximum quantity of CSI processes, a maximum quantity of transmit and receive antennas, or a maximum quantity of low-density parity-check code iterations.

15. The UE of claim 12, wherein the one or more processors are further configured to:

receive, in a second time window, one or more second PDSCH transmissions based at least in part on the CSI report including the CSI associated with the one or more first PDSCH transmissions in the first time window.

16. A base station for wireless communication, comprising:

a memory; and one or more processors, coupled to the memory, configured to:

transmit, to a user equipment (UE), a first physical downlink shared channel (PDSCH) transmission using a first modulation and coding scheme (MCS); and receive, from the UE, feedback associated with the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting by the UE.

17. The base station of claim 16, wherein the one or more processors are further configured to:

transmit, to the UE, a second PDSCH transmission using the second MCS.

18. The base station of claim 16, wherein the indication of the second MCS includes an indication of a difference between the first MCS and the second MCS.

19. The base station of claim 16, wherein the indication of the second MCS includes an indication of an index value of a plurality of index values, each associated with a respective configuration of an MCS and a power splitting factor for energy harvesting.

20. The base station of claim 19, wherein the one or more processors are further configured to:

transmit, to the UE, configuration information including an indication of the plurality of index values and the respective configuration of the MCS and the power splitting factor associated with each index value of the plurality of index values.

21. The base station of claim 16, wherein the target BLER is associated with at least one of an energy harvesting mode or an energy state of the UE.

22. The base station of claim 21, wherein the one or more processors are further configured to:

receive, from the UE, an indication of the at least one of the energy harvesting mode or the energy state of the UE; and transmit, to the UE, configuration information including an indication of the target BLER associated with the at least one of the energy harvesting mode or the energy state of the UE.

23. The base station of claim 21, wherein the one or more processors are further configured to:

transmit, to the UE, configuration information including an indication of a plurality of target BLERs for a same priority, wherein the plurality of target BLERs are associated with respective energy harvesting modes or energy harvesting states, and wherein the target BLER is one of the plurality of target BLERs.

24. A method of wireless communication performed by a user equipment (UE), comprising:

receiving, from a base station, a first physical downlink shared channel (PDSCH) transmission transmitted using a first modulation and coding scheme (MCS); and transmitting, to the base station, feedback based at least in part on decoding the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting.

25. The method of claim 24, further comprising:

receiving, from the base station, a second PDSCH transmission transmitted using the second MCS.

26. The method of claim 25, further comprising:

decoding the second PDSCH transmission using a first portion of a total received power associated with the second PDSCH transmission; and performing energy harvesting from the second PDSCH transmission using a second portion of the total received power associated with the second PDSCH transmission, wherein the first portion and the second portion of the total received power are based at least in part on a power splitting factor associated with the target charging rate.

27. The method of claim 24, wherein the second MCS is based at least in part on an adjusted signal-to-interference-plus-noise ratio (SINR) associated with the target charging rate and the target BLER.

28. The method of claim 27, wherein the adjusted SINR is based at least in part on a measured SINR of the first PDSCH transmission and a power splitting factor associated with the target charging rate.

29. A method of wireless communication performed by a base station, comprising:

transmitting, to a user equipment (UE), a first physical downlink shared channel (PDSCH) transmission using a first modulation and coding scheme (MCS); and receiving, from the UE, feedback associated with the first PDSCH transmission, wherein the feedback includes an acknowledgement (ACK) or negative acknowledgement (NACK) and a channel state information (CSI) report that includes at least an indication of a second MCS based at least in part on a target block error rate (BLER) and a target charging rate for energy harvesting by the UE.

30. The method of claim 29, further comprising:

transmitting, to the UE, a second PDSCH transmission using the second MCS.

* * * * *